(12) United States Patent
Shenoi

(10) Patent No.: US 7,535,900 B2
(45) Date of Patent: May 19, 2009

(54) MULTIPLE TRANSMISSION BANDWIDTH STREAMS WITH DEFFERENTIATED QUALITY OF SERVICE

(75) Inventor: Kishan Shenoi, Saratoga, CA (US)

(73) Assignee: Symmetricom, Inc., San Jose, CA (US)

( * ) Notice: Subject to any disclaimer, the term of this patent is extended or adjusted under 35 U.S.C. 154(b) by 1001 days.

(21) Appl. No.: 10/759,391

(22) Filed: Jan. 16, 2004

(65) Prior Publication Data
US 2004/0208120 A1 Oct. 21, 2004

Related U.S. Application Data

(60) Provisional application No. 60/441,327, filed on Jan. 21, 2003.

(51) Int. Cl.
*H04L 12/28* (2006.01)
*H04L 12/56* (2006.01)
*H04J 3/24* (2006.01)

(52) U.S. Cl. .................. 370/389; 370/355; 370/401; 370/395.21; 370/395.72; 370/474

(58) Field of Classification Search ......... 370/229–237, 370/355–360, 394, 381, 389, 401, 412, 395.21, 370/395.4, 474, 477, 395.72, 428
See application file for complete search history.

(56) References Cited

U.S. PATENT DOCUMENTS 5,379,297 A * 1/1995 Glover et al. ............... 370/234
6,985,442 B1 * 1/2006 Wang et al. ................. 370/232

* cited by examiner

*Primary Examiner*—Afsar M. Qureshi
(74) *Attorney, Agent, or Firm*—Patterson & Sheridan, LLP

(57) ABSTRACT

Methods and apparatus are described for providing multiple transmission bandwidth streams with differentiated quality of service on a inter-machine trunk. One approach includes time-division multiplexing. Another approach includes statistical multiplexing. Another approach includes packet segmentation. The approaches are commercially important because they significantly reduce time-delay variation.

79 Claims, 13 Drawing Sheets

MULTIPLE TRANSMISSION BANDWIDTH STREAMS WITH DEFFERENTIATED QUALITY OF SERVICE

CROSS-REFERENCE TO RELATED APPLICATION

This application is related to, and claims a benefit of priority under 35 U.S.C. 119(e) from copending provisional patent application U.S. Ser. No. 60/441,327, filed Jan. 21, 2003, the entire contents of which are hereby expressly incorporated herein by reference for all purposes.

BACKGROUND OF THE INVENTION

1. Field of the Invention

The invention relates generally to the field of communications. More particularly, the invention relates to multiple transmission bandwidth streams with differentiated quality of service.

2. Discussion of the Related Art

The modern Internet has its roots in ARPANET, a network used primarily by academic institutions to link computers. Internet protocol (IP) has its roots in ARPANET and is the predominant choice for Layer-3 protocol suites in modern networks. IP is particularly appropriate for data communication, involving file transfers and other "non-real-time" applications. The Internet, however, is being considered for a variety of applications, including, but not restricted to, real-time applications such as voice communication (VoIP, or Voice over IP). This multiplicity of services, with different needs, is being addressed by protocol enhancements such as DiffServ (for differentiated services), whereby packet streams are identified and processed according to specific needs. Some services, such as file transfer, can tolerate longer time delays and larger time-delay variations than other services, such as VoIP that demand shorter delays and small time-delay variation. Such service attributes are collectively referred to by the term Quality of Service (abbreviated QoS). In particular, a small time-delay variation is associated with a high QoS and a large time-delay variation associated with a low QoS. Whereas QoS is a generic term and is the amalgamation of various service attributes, the primary attribute of relevance here is time-delay variation.

Traditional, and proposed, methods for providing differentiated services have been proposed (e.g. DiffServ) whereby packets associated with a service requiring higher quality of service are identified and assigned a higher priority as well as preferential treatment for transmission. One enhancement to this traditional approach has utilized the notion of absolute time for scheduling packet transmission. The scheduling approach involves segregating services based on QoS requirements and blocking out periodic intervals of time wherein transmission of only those packets requiring high-QoS can be initiated.

The preponderance of modern networking proposals and architectures are based on packet switching as is evident from the spectacular growth of the Internet. Most packet switching schemes are based on IP which is a set of protocols associated with the packetization of traffic information and the associated routing methods. This is in contrast to the traditional or legacy methods based on circuit switching. Probably the most fundamental distinction between the two architectures is that in IP networks the information elements, namely packets, "find" their way from source to destination and different packets associated with the same transaction may follow different routes. In contrast, in circuit-switched networks, a path (or "circuit") is established first and the information associated with the transaction follows the same path through the network. In circuit-switched networks each "call" is guaranteed to have adequate transmission bandwidth to assure a constant bit-rate and traffic remains in-sequence. In contrast, in packet-switched networks it is difficult to guarantee a constant bit-rate (without much bandwidth over-subscription), packets may be delivered out-of-sequence, the transmission delay is not fixed, and there may be significant transmission delay variation from packet to packet. An excellent treatment of communication protocols and methods is provided in [Ref. 1.1] and specifics related to IP are described in [Ref. 1.2].

Whereas packet-switched networking may have some significant advantages relative to circuit-switched networking, there are some disadvantages, primarily related to Quality of Service ("QoS"). Whereas the term QoS may evoke numerous and varied interpretations, the term is used here in a somewhat narrow manner. In particular, the notion of QoS, for the purposes of this discussion, is limited to a measure of time-delay variation. "High" QoS implies that the traffic is delivered from source to destination with a small time-delay variation (often called "jitter"); "low" QoS implies that the time-delay variation is not guaranteed to be small. Note that low QoS does not imply lower reliability; low QoS does not imply higher packet loss; low QoS does not imply lower throughput; if fact the term low QoS does not relate to a layman's view of low quality; for this discussion low QoS is simply equivalent to uncertainty in transmission delay. Certain types of traffic, such as computer-to-computer communication involving file transfers, can be assigned to low QoS channels with insignificant impact in performance. Other types of traffic, typically time-sensitive traffic such a voice communication, require the channel to have a high QoS. Circuit-switched networks, which "nail" up bandwidth for a given call, generally provide a high QoS but can be viewed as bandwidth inefficient since the particular channel is not available for other traffic even during pauses; packetization is one way to improve transmission facility usage since the overall bandwidth is effectively shared between all active calls.

Time-delay variation in packet-switched networks has several causes. One of the principal causes is the sharing transmission resources. Ironically, sharing of transmission resources is considered one of the principal advantages of packet-switched (as well as cell-switched and frame-switched) networking architectures over traditional circuit-switched schemes. The reason for variable delay in packet-switched networks is best illustrated by a simple example using the configuration of FIG. 1.

The simple network of FIG. 1 comprises two locations, each with its LAN (Local Area Network) and interconnected over a Wide Area Network (WAN) with the WAN segment linking two routers (packet switches), one in each location. The WAN segment could, be, for example, a private line DS1 (often referred to as a T1 link) obtained from a Telecommunications Service Provider ("Phone Company"). That is, the WAN link is equivalent to a channel with bandwidth (i.e. bit-rate) of 1.536 Mbps (conventional DS1 has a bit rate of 1.544 Mbps but very often 8 kbps are used for framing and performance monitoring purposes, leaving 1.536 Mbps for end-to-end communication). Whereas many different types of LANs exist, the most common deployment is Ethernet, so we will assume that the LAN segments are either 10 Mbps or 100 Mbps Ethernet LANs. All traffic between the LAN segments at the two locations traverses the WAN over the DS1 link.

The data to be transferred is in the form of packets; the generic structure of a packet is shown in FIG. 2. Every packet comprises three parts. The first part is the header and the bits in the header provide information on the source address, destination address, protocol used and other such information. The body of the packet is the actual information, often called the payload.

The footer (or "trailer") is usually a check-sum whereby the transmitter generates a CRC (Cyclic Redundancy Check) code based on the packet content and the receiver does likewise. If the check-sums do not agree then there was a transmission error and the contents of the packet are suspect and the conventional action is to discard the packet. For every protocol (or set thereof) the size of the header and footer (together referred to as overhead) is predetermined (say N bytes). The size of the body, or payload can be variable, though all protocols assign a maximum and minimum size (the maximum size is typically very large compared to N). Clearly larger packets are more efficient in the sense of payload to overhead ratio and thus it is advantageous, from the viewpoint of maximizing transmission bandwidth utilization, to use large packet sizes where possible.

Now suppose that a voice call is made between location A and location B and the method used is Voice-over-IP ("VoIP"). That is, the voice signal is digitized and packetized for transmission over the WAN link. Voice traffic is an example of traffic that requires a high QoS. The voice packetization is accomplished by segmenting the voice signal into "blocks", typically 10 msec in duration, and generating a packet of information for the block. Considering that speech (telephony) signals are sampled at 8 kHz and use one octet per sample (for "uncompressed" speech), the packet payload requires just 80 bytes to transport the speech samples for a block. The payload size is determined by various factors such as the number of simultaneous voice signals, the level of compression, block size, and other factors but it is generally true that packets for voice (which exemplifies a high QoS requirement) will be "small" and be generated very repetitively. For the sake of this example, suppose the repetition interval is 10 msec and the packet size is 1500 bits (this size is chosen solely to simplify the arithmetic). Each packet thus occupies 1 msec of every 10 msec of the WAN channel (approximated as a 1500 kbps link). In the absence of any other WAN traffic, each packet would go through on time and "on schedule" and there would be no time-delay variation (corresponding to a very high QoS). If we assume that the LAN operates at 10 Mbps, each voice packet occupies just 0.15 msec of every 10 msec of the LAN segment. A simplified time-and-event diagram of the situation is depicted in FIG. 3.

As shown in FIG. 3, voice packets arrive at the router on the LAN side every 10 msec and, after a small delay (for processing and reformatting as required), appear on the WAN transmission link with an inter-packet interval of 10 msec. The layer-2 (also called "link layer") processing ensures that when actual data is not available for transmission, idle cells or idle flags are generated to keep the WAN link "alive". (The information packets are generally associated with Layer-3 of the data communication model. The layer-2 reformatting is sometimes necessary to address the matching of layer-3 to the physical layer, namely layer-1, corresponding to the actual transmission scheme. A brief description of layer-2 is provided below.) (A comprehensive treatment of layered communication is provided in [Ref. 1.1]).

To see the impact of additional traffic on the voice stream, consider the hypothetical case a concurrent file transfer. Assume that the file-transfer application generates packets of size 15,000 bits (which is not a large packet for file-transfer) and consider the impact of just one data packet on the voice transmission performance. A data packet takes 10 msec on the WAN link. A simplified time-event depiction of the impact of this single data packet is shown in FIG. 4.

Considering the WAN link, since the data packet occupies 10 msec and the voice packet occupies 1 msec, the time-separation between the first two voice packets shown is greater than 11 msec; similarly, assuming that there was just this one data packet, the time separation between the second and third voice packets shown could be less than 9 msec. Considering that the normal separation between voice packets is 10 msec, the configuration as shown introduces a time-delay variation of 1 msec. Depending on the precise ingress time of the data packet from the WAN into the router, this time-delay variation could be much larger. The delay-variation problem is only exacerbated if the size of the data packet is larger and can be devastating if the number of data packets is significant (unless other actions are taken to "assist", to the extent possible, the voice packet stream).

In actual practice, the network may comprise multiple routers and multiple paths between locations A and B, especially if the link between the two customer-premise-located routers is achieved using the public internet. A particular voice packet stream will experience time-delay-variation pressure in each transmission segment that the packets traverse. Generally speaking, the following rules of thumb apply.

Time-delay-variation is caused and/or exacerbated by the following factors:

1. Congestion; packets traversing a transmission segment that is highly loaded will be delayed by varying amounts, the delay variation increasing with congestion.

2. Packet size; a packet stream sharing bandwidth with other streams will be impacted by the size of the packets of the other streams it is sharing transmission bandwidth with. In particular, if the packet size of the other stream(s) is large, the packet stream under consideration will experience significant time-delay variation.

The following are, generally speaking, the characteristics of different packet streams:

1. Streams requiring high QoS (i.e. low time-delay variation) are usually associated with real-time communication, such as voice. Packets are generally small but are regularly spaced. The average bit-rate is "small" but uniform. Loss of a packet is generally ignored and the concomitant impact on the information signal (such as the speech) is "accepted" albeit highly undesirable.

2. Streams that can tolerate a low QoS (i.e. a large time-delay variation) are usually associated with non-real-time communications, such as computer-to-computer file transfers. Packets are generally large and the traffic is "bursty" with packets closely spaced during actual information transfer and sparse otherwise; the notion of average bit-rate is not that relevant since bursts of information are interspersed with intervals, possibly long, of little to no information. The loss of a packet is detected by higher layers and a request for retransmission is sent.

Conventional Approaches to Providing Variable QoS

In order to describe conventional approaches to "solving" the QoS problem, we first need to recognize the general working of a packet-switching device, namely a router. A simplified diagram of the WAN port of a router is depicted in FIG. 5. A typical router (packet switch) may have a multiplicity of WAN interfaces (for Inter-Machine trunks) as well as one or more LAN interfaces. These interfaces provide for the ingress and egress of packets. The principal function of the router is to process incoming packets, discard packets if necessary, and decide which egress port each packet must be forwarded to for outbound transmission.

With reference to FIG. 5, the block labeled Packet Processor is where the processing associated with the protocol suite is performed. Modern implementations use software stacks running on high-powered microprocessors which are specially designed to have "hardware assist" for the types of operations that need to be performed (such devices are often called Network Processors). With reference to the layered model for data communications, the packet processor performs the Layer-3 (and sometimes higher layers as well) functions as well as, possibly, functions associated with the control plane (network management tasks). For a given packet, using routing tables and other sophisticated techniques, the packet processor determines the egress port and places the packet in an outgoing queue for subsequent outbound transmission. This determination is also depicted in FIG. 5. The queue is nominally equivalent to a FIFO (first-in-first-out) buffer, but the IP protocol suite does not require cells to be transmitted (or received) in order and thus the queue does not necessarily have to be FIFO.

The block labeled Layer-2 processing extracts packets from the transmit queue and prepares them for outbound transmission. The layer-2, or link layer processing has multiple functions.

Historically, when physical transmission media were not as advanced as today and often had "high" bit-error rates, the link layer was responsible for error detection as well as requests for retransmission; the intent was to provide the higher layer data that was substantially error free (albeit with "gaps" and "delays"). One benefit of this historical approach was economy since the higher layer processing was "slow" and "expensive". Modern network processors are fast and inexpensive and this historic benefit of the link layer is moot. In modern packet-switched networks, the link layer rarely is responsible for retransmission requests, this function having migrated to higher layers. A second function of the Layer-2 processing block is to generate data streams (bit streams or octet streams) that are matched to the needs of the physical medium. For example, if the physical medium corresponds to a DS1 (or T1) link, the line bit-rate is 1.544 Mbps and the payload bit-rate is 1.536 Mbps. The Layer-2 processing block must provide the necessary "fill-in" units such that the bit stream (octet stream) provided to the physical medium corresponds to 1.536 Mbps.

The most prevalent choices for Layer-2 are HDLC (high-level data link control) and ATM (asynchronous transmission mode). HDLC is a formatting method that takes the packet and treats it as a payload unit. The flavor(s) used in telecommunications are specified in [Ref. 1.1, 1.3, 1.4, 1.5, 6.1, 6.2]. The payload unit is encapsulated in an HDLC frame. The frame size can be variable and the frame includes the payload, a header that can be used for addressing purposes and a trailer that provides a CRC check-sum for error detection purposes. Frames received with incorrect CRC check bit-sequences are discarded. Typically, each IP packet is encapsulated in one HDLC frame (as the payload). The fill-in unit defined for HDLC is the flag, corresponding to an octet with bit pattern 01111110. Care is taken, by appropriately inserting "0" bits, that the frame (header, payload and trailer) does not contain a pattern that could be confused with a flag. There is typically at least one flag between successive frames. HDLC is used in frame-relay networks wherein the transmission across the network encounters frame-relay switches, permitting the service provider to route the frames (i.e. HDLC traffic units) to the appropriate destination, thereby providing virtual circuits (VCs). Such "Layer-2" networks are quite popular in North America. If the two ends of the bit-stream of the physical medium are both routers (i.e. the bit-stream corresponds to an inter-machine trunk), then the notion of Layer-2 networking is moot. Layer-2 HDLC framing, with its ability to distinguish frames based on addresses, can be utilized to advantage even in the point-to-point case of inter-machine trunks.

ATM utilizes a format where each cell is a fixed size, namely 53 octets. A comprehensive treatment of ATM is available in [Ref. 5.2]. Of these 53 octets in an ATM cell, 5 octets comprise the header and 48 octets used for the payload. The header includes addressing information in the form of VPI\NCI (Virtual Path Identifier and Virtual Circuit Identifier) . Furthermore, the header contains one octet for protecting the information content of the header but the 48-octet payload unit does not have any error checking mechanism. A cell is discarded if the header error checking detects a "fatal" error; payload errors can go undetected but higher layer protocols usually are geared to address this problem. The procedure for formatting the payload, in this case data packets, into cells is determined by rules referred to as an ATM Adaptation Layer or AAL. AAL5 is one form of AAL (AAL0, AAL1, and AAL2 are the other common AAL types) suitable for data transmission of packets. For reference, the method most often used for formatting constant-bit-rate streams into ATM cells is AAL1 (see, for example, [Ref. 5.3]); the method most often used for formatting bit-streams associated with speech into ATM cells is AAL2 (see, for example, [Ref. 5.4, 5.5]); the term AAL0 is used when the rule is proprietary or not known by any devices except the end-points. The fill-in unit is an idle cell, easily distinguished by information in the header. ATM is used in cell-relay networks wherein the transmission across the network encounters ATM switches, permitting the service provider to route the cells to the appropriate destination, providing virtual circuits (VCs). Such "Layer-2" networks based on ATM are quite popular in Europe as well as North America. Again, if the two ends of the bit-stream of the physical medium are both routers (i.e. the bit-stream corresponds to an inter-machine trunk), then the notion of Layer-2 networking is moot. Layer-2 ATM formatting, with its ability to distinguish cells based on addresses, can be utilized to advantage even in the point-to-point case of inter-machine trunks.

The Layer-2 processing block provides the physical medium dependent (PMD) processing block with the outbound data stream. The PMD processing block adds any overhead necessary prior to transmission. For example, the physical medium could be a T1 line and, in this case, the PMD function would comprise the DSU/CSU function, including formatting the 1.536 Mbps from the Layer-2 processing block into a 1.544 Mbps DS1 signal with the addition of either D4 or ESF framing, and outputting the resultant bit-stream as a bipolar AMI/B8ZS signal. The inbound direction can be described in a similar manner.

The PMD processing involves extracting the 1.536 Mbps DS1 payload from the incoming T1 signal and presenting it to the Layer-2 processing block. The packets are extracted from the HDLC frames or ATM cells and are placed in the receive queue from which the packets are extracted by the packet processor block for further processing. Generally speaking, the receive direction does not introduce any detrimental effects related to time-delay variation (i.e. QoS) since the packet processor block is usually sufficiently powerful to handle packets at the rate at which they enter.

Assigning Priority to Packets for QoS

As mentioned above, the transmit queue does not necessarily have to exhibit a FIFO behavior. A suite of protocols at the IP layer have been developed, generically referred to as DiffServ (for differentiated services) that deal with the assignment of priorities to packet streams. Packets associated with streams that require a high QoS are assigned a higher priority than packets associated with a stream for which high QoS is less important. Whereas this functionality could be associated with the packet processor block, it is illustrative to show the functionality of a queue manager explicitly, as depicted in FIG. 6. A comprehensive view of DiffServ can be obtained from [Ref. 3.1 through 3.15].

Whereas FIG. 6 depicts the queue manager block as handling packets in both the transmit as well as receive directions, if the packet processor block can handle incoming packets "in real-time", the queue manager has less of a role to play in the receive direction. The principal function of the queue manager, in the transmit direction, is to choose the next packet for transmission. The rationale is quite straightforward. The highest priority packet in the queue, assuming it is nonempty, is chosen. When used in this manner, the queue is, strictly speaking not FIFO (so the nomenclature of "queue" may be somewhat of a misnomer) but does provide the mechanism whereby transmission of a packet associated with a high-QoS service can precede the transmission of a lower-QoS packet even though the latter was generated and placed in the buffer earlier than the former.

Many variations of this simple technique can be promulgated, including methods whereby the priority of a packet is (artificially) increased based on the time spent in the queue. Such a mechanism may be required to prevent a high-QoS stream from blocking a low-QoS stream entirely.

Combination of Priority and Scheduling for Providing QoS

Using a priority based scheme for providing differentiated services and attempting to maintain a high QoS for streams that require it is now well established and forms the basis for just about every approach for providing the requisite QoS. One technique for enhancing this scheme is based on scheduling. A more complete description of time-scheduling for providing QoS differentiation is provided in U.S. Pat. Nos. 6,038,230; 6,259,695; 6,272,131; 6,272,132; 6,330,236; 6,377,579; and 6,385,198 [Ref. 4.1 through 4.7] and citations therein.

Consider the situation where packet streams are generically considered "high-QoS" and "low-QoS". The streams classified as high-QoS are typically those associated with a constant bit-rate or low-delay-variation service and we have pointed out earlier that such streams use packets that are usually small and typically very regularly spaced in time. The streams classified as low-QoS are typically those associated with computer-to-computer communication involving (large) file transfers and use packets that are usually large and often irregularly spaced in time (note that the term low-QoS does not imply that the streams require low QoS but, rather, that they can tolerate large time-delay variation). This situation is depicted in FIG. 7. For convenience, only the transmit section is depicted in FIG. 7.

An important element shown in FIG. 7 is the function of a time interval manager block. The time interval manager establishes a periodic interval structure whereby time is "blocked" out into intervals that can be termed "high-priority" and "low-priority". For example, time may be split into 10 msec intervals and the first 1 msec is considered "high-priority" and the remaining 9 msec is considered "low-priority".

The simplest scheduling approach for providing differentiated QoS is to restrict the initiation of packet transmission based on interval and priority. In particular, in the high-priority interval, only packets from the high-QoS queue can be initiated. Transmission of packets in the low-QoS queue can be initiated only during the low-priority interval. A refinement of this simple approach that addresses congestion levels is to permit initiation of transmission of packets in the high-QoS queue during both high-priority intervals and low-priority intervals. Further, the scheduling method can be applied in conjunction with the priority approach, whereby the high-QoS and low-QoS queues can in turn have packets of differentiated priorities (again the queues are not necessarily FIFO).

SUMMARY OF THE INVENTION

There is a need for the following aspects of the invention. Of course, the invention is not limited to these aspects.

According to an aspect of the invention, a process comprises: providing multiple transmission bandwidth streams with differentiated quality of service on a digital bit-stream inter-machine trunk located between a first packet router and a second packet router including: segregating a packet stream into at least a high-quality of service packet stream and a low-quality of service packet stream using a packet processor located at the first packet router; buffering the high-quality of service packet stream using a high-quality of service queue; buffering the low-quality of service packet stream using a low-quality of service queue; formatting the high-quality of service packet stream to generate a first data stream channel independently of the low-quality of service packet stream; formatting the low-quality of service packet stream to generate a second data stream channel independently of the high-quality of service packet stream; time-division multiplexing the first data steam channel and the second data stream channel to define a multiplexed data stream including a plurality of payloads, wherein at least some of each of the plurality of payloads of the multiplexed data stream includes a high-quality of service portion and a low-quality of service portion; and transmitting the multiplexed data stream on the digital bit stream inter-machine trunk using the first packet router. According to another aspect of the invention, a machine comprises: a first packet router including a first packet processor; a digital bit-stream inter-machine trunk coupled to the first packet router; and a second packet router coupled to the digital bit-stream inter-machine trunk, the second packet router including a second packet processor, wherein the first packet processor segregates a packet stream into at least a high-quality of service packet stream and a low-quality of service packet stream, and the first packet router: buffers the high-quality of service packet stream using a high-quality of service queue; buffers the low-quality of service packet stream using a low-quality of service queue; formats the high-quality of service packet stream to generate a first data stream channel independently of the low-quality of service packet stream; formats the low-quality of service packet stream to generate a second data stream channel independently of the high-quality of service packet stream; time-division multiplexes the first data steam channel and the second data stream channel to define a multiplexed data stream including a plurality of payloads, wherein at least some of each of the plurality of payloads of the multiplexed data stream includes a high-quality of service portion and a low-quality of service portion; and transmits the multiplexed data stream on the digital bit stream inter-machine trunk using the first packet router.

According to another aspect of the invention, a process comprises: providing multiple transmission bandwidth streams with differentiated quality of service on a digital bit-stream inter-machine trunk located between a first packet router and a second packet router including: segregating a packet stream into at least a high-quality of service packet stream and a low-quality of service packet stream using a packet processor located at the first packet router; buffering the high-quality of service packet stream using a high-quality of service queue; buffering the low-quality of service packet stream using a low-quality of service queue; formatting the high-quality of service packet stream to generate a first data stream channel independently of the low-quality of service packet stream; formatting the low-quality of service packet stream to generate a second data stream channel independently of the high-quality of service packet stream; buffering the first data stream channel using a high-quality of service first-in-first-out queue; buffering the second data stream channel using a low-quality of service first-in-first-out queue; statistical-multiplexing the first data steam channel and the second data stream channel to define a multiplexed data stream including a plurality of data structures selected from the group consisting of cells and frames; and transmitting the multiplexed data stream on the digital bit stream inter-machine trunk using the first packet router. According to another aspect of the invention, a machine comprises: a first packet router including a first packet processor; a digital bit-stream inter-machine trunk coupled to the first packet router; and a second packet router coupled to the digital-bit stream inter-machine trunk, the second packet router including a second packet processor, wherein the first packet processor segregates a packet stream into at least a high-quality of service packet stream and a low-quality of service packet stream, and the first packet router: buffers the high-quality of service packet stream using a high-quality of service queue; buffers the low-quality of service packet stream using a low-quality of service queue; formats the high-quality of service packet stream to generate a first data stream channel independently of the low-quality of service packet stream; formats the low-quality of service packet stream to generate a second data stream channel independently of the high-quality of service packet stream; buffers the first data stream channel using a first-in-first-out high-quality of service queue; buffers the second data stream channel using a first-in-first-out low-quality of service queue; statistically multiplexes the first data steam channel and the second data stream channel to define a multiplexed data stream including a plurality of data structures selected from the group consisting of cells and frames; and transmits the multiplexed data stream on the digital bit stream inter-machine trunk using the first packet router.

According to another aspect of the invention, a process comprises: providing transmission bandwidth on a single inter-machine trunk located between a first packet router and a second packet router including: restricting packet size using a packet processor located at the first packet router when an outbound packet exceeds a size threshold by segmenting the outbound packet into a plurality of packets; and transmitting the plurality of packets on the single inter-machine trunk using the first packet router. According to another aspect of the invention, a machine comprises: a first packet router including a first packet processor; a single inter-machine trunk coupled to the first packet router; and a second packet router coupled to the single inter-machine trunk, the second packet router including a second packet processor, wherein the first packet processor restricts packet size by segmenting an outbound packet into a plurality of packets when the outbound packet exceeds a size threshold.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals (if they occur in more than one view) designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
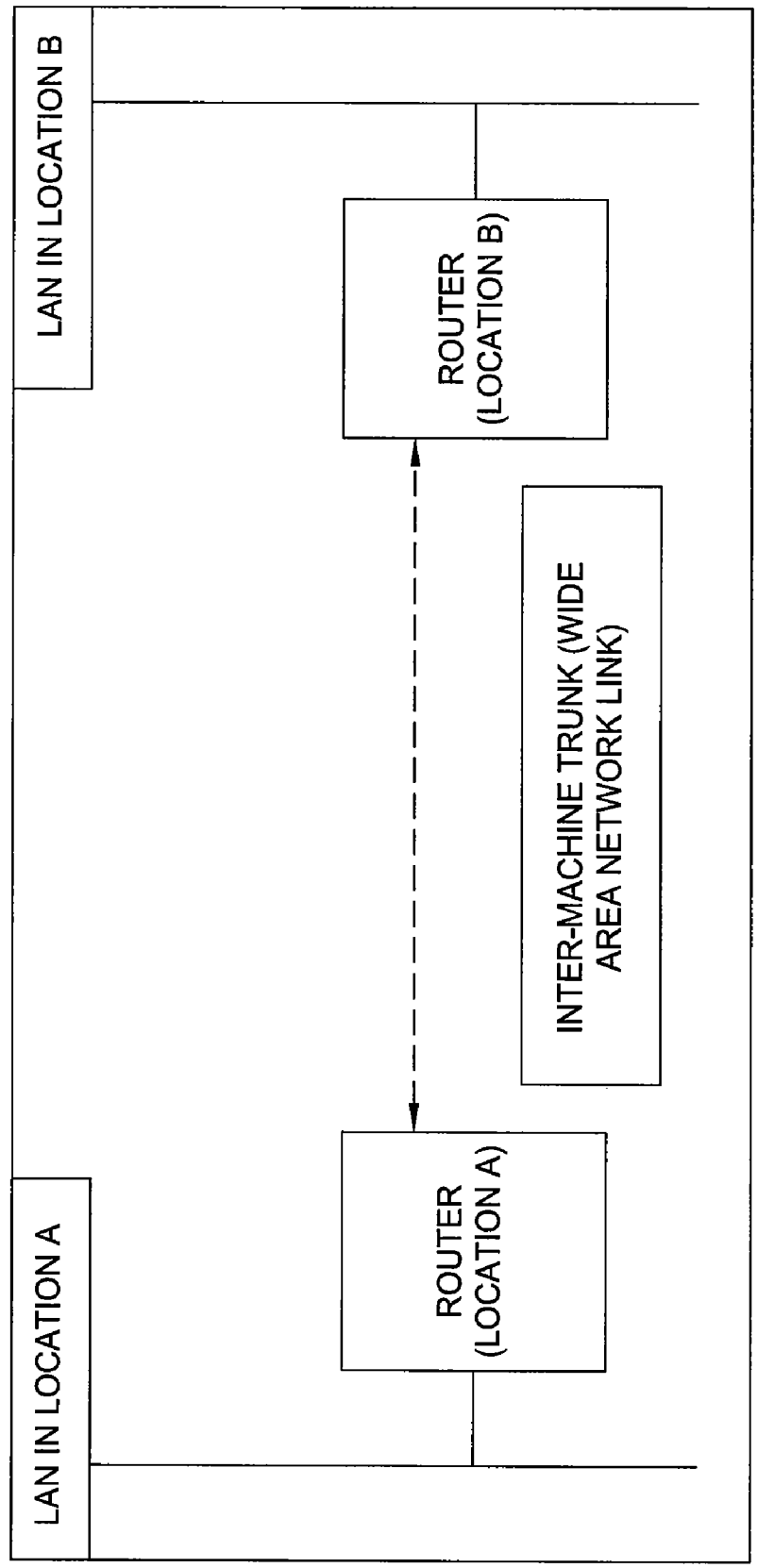
FIG. 1 illustrates a schematic block diagram of a conventional simple network to illustrate quality of service, appropriately labeled "PRIOR ART."

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Within this application several publications are cited with the abbreviation "Ref." followed by one or more decimal numerals, within brackets. Full citations for these, and other, publications may be found at the end of the specification immediately preceding the claims after the section heading References. The disclosures of all these publications in their entireties are hereby expressly incorporated by reference herein for the purpose of indicating the background of the invention and illustrating the state of the art.

The below-referenced U.S. Patents disclose embodiments that are useful for the purposes for which they are intended. The entire contents of U.S. Pat. Nos. 6,038,230; 6,259,695; 6,272,131; 6,272,132; 6,330,236; 6,377,579; and 6,385,198 are hereby expressly incorporated by reference herein for all purposes.

Overview

The invention can include an architecture that involves segregation of services into "High-QoS" and "Low-QoS" queues and utilizes distinct permanent virtual circuits (or distinct layer-1 channels) for these two queues. This approach guarantees that the large packet sizes usually associated with file transfers (an example of an application that does not need a high QoS) does not impact the time-delay variation of packet transmission of other services requiring a high QoS (such as VOIP) even though both packet streams may share the same physical transmission medium. Clearly more than two PVCs will provide a finer resolution in quality of service, but two appears to be the best compromise between service differentiation on the one hand and efficiency of bandwidth utilization and implementation complexity on the other hand.

This architecture finds application not just in cases where two routers are interconnected by a single physical link, but also in general IP networks. In the case of general IP networks, preferred embodiments of the invention can include implementing the Layer-3 functionality associated with packet-switched networks over a Layer-2 network such as ATM or Frame-Relay with the Layer-2 network providing a pair of PVCs between interconnected routers as opposed to a single PVC inter-router layer-2 connection.

The context of the invention can include a local area network (e.g., intrabuilding). The context of the invention can include a metropolitan area network (e.g., intracity). The context of the invention can include a wide area network (e.g., intercity).

Packet Size Restriction Differentiated Services

One of the drawbacks of using large packet sizes becomes evident if there are transmission errors. If a packet is deemed to have errors, it is discarded and (this is the responsibility of a higher layer process) a request for retransmission is made. Clearly, if the packet size is large, even a low bit-error rate can have a significant deleterious impact on performance. Furthermore, this deleterious impact is worsened by long delays in transmission. This problem is well known and it is common for end-points (servers or computers) to recognize this possibility and split large packets into smaller packets at the transmitter in a way that the receiver can reconstruct the large packet when all the constituent (smaller) packets have been received.

Whereas this technique of packet segmentation is well known, it has not been proposed as a method for improving QoS on inter-machine trunks. The technique has been used primarily when the end-points are separated by a network but has never been applied for any purpose in the point-to-point link between packet switches (i.e. between routers). As has been described before, large packet sizes are useful from the viewpoint of efficient use of bandwidth and are, generally speaking, not harmful to the packet stream of which they are a constituent part. However, large packet sizes could have a deleterious impact on other packet streams that share the same physical layer transmission bandwidth.

Figure 6:
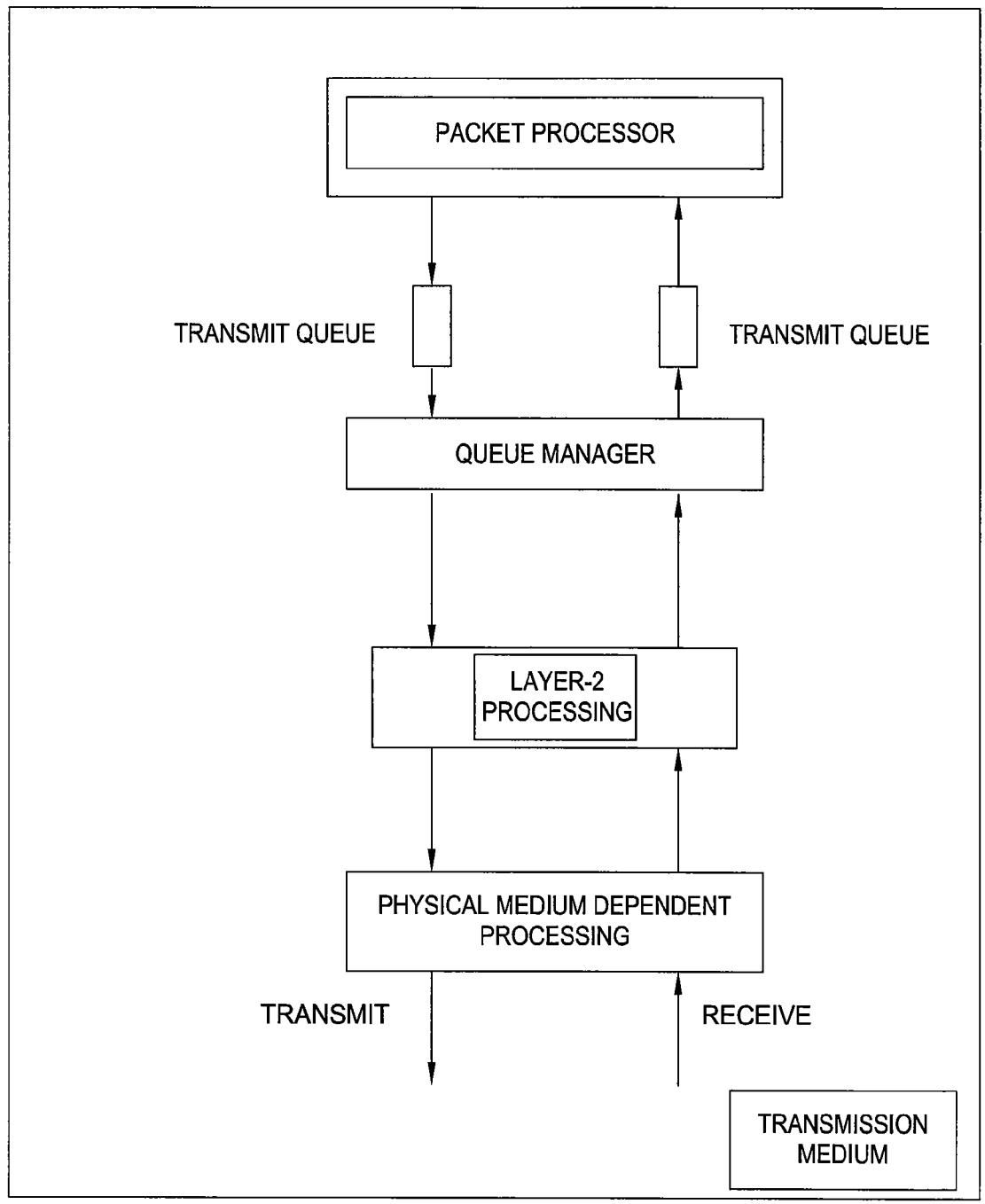
FIG. 6 illustrates a schematic block diagram of a conventional wide area network (WAN) link interface of packet switch (router) showing a queue manager for differentiating services, appropriately labeled "PRIOR ART."
Figure 7:
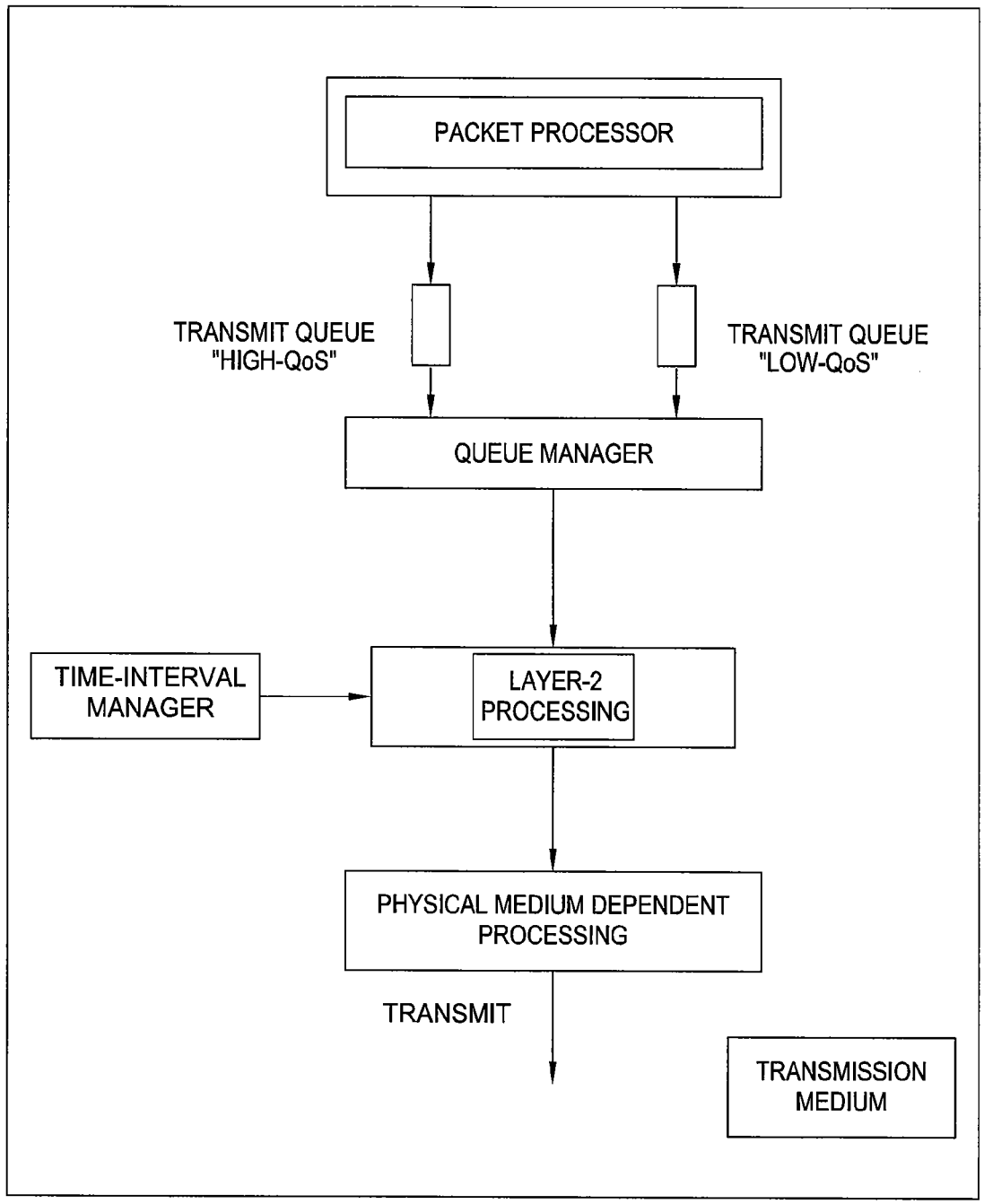
FIG. 7 illustrates a schematic block diagram of a conventional transmit side of a WAN link interface of a packet switch (router) showing a dual queue structure and Time-Interval Manager for providing differentiated, appropriately labeled "PRIOR ART."
Figure 8:
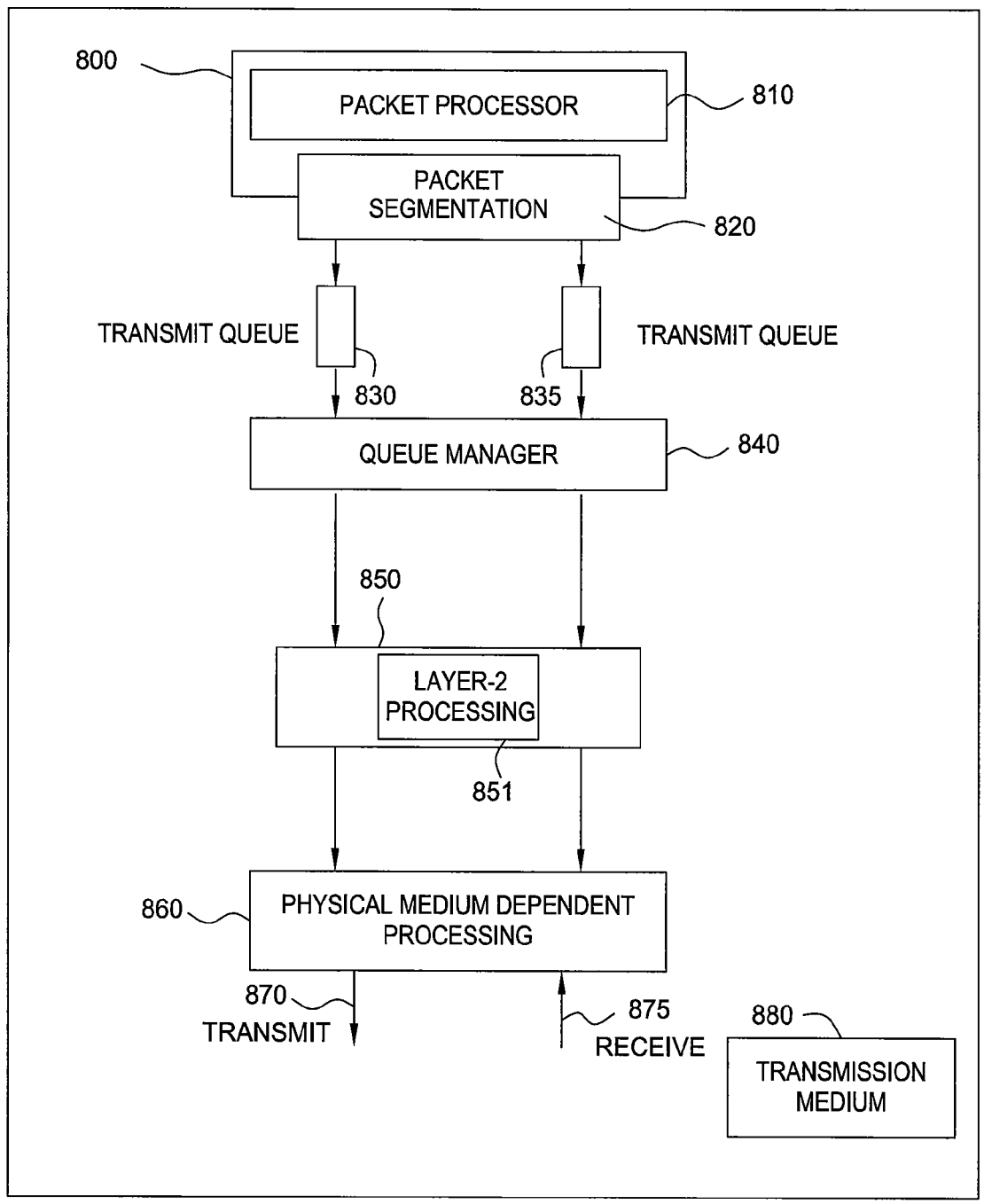
FIG. 8 illustrates a schematic block diagram of a WAN (Inter-Machine Trunk) link interface of a packet switch (router) showing the packet segmentation function for improved quality of service, representing an embodiment of the invention.

The introduction of the packet segmentation function is depicted in FIG. 8, which is an improvement to the system depicted in FIG. 6. Referring to FIG. 8, a packet router 800 includes a packet processor 810. The packet router 800 also includes a packet segmentation block 820. The packet segmentation block is coupled to both a transmit queue block 830 and a receive queue block 835. The transmit queue block 830 and the receive queue block 835 are coupled to a queue manager block 840. The queue manager block 840 is coupled to a layer-2 block 850. The layer-2 block 850 includes a layer-2 processing block 851. The layer-2 block 850 is coupled to a physical medium dependent processing block 860. The physical medium dependent processing block transmits signals 870 via an associated transmission medium 880 and receives signals 875 via the associated transmission medium 880.

The packet segmentation block can be considered part of the packet processor block and represents the action of restricting the size of packets to a predetermined size. That is, large outbound packets are segmented (fragmented) into smaller packets for transmission. Considering that this is for an inter-machine trunk, there is no impact to the actual service because the receive node will reassemble the packet to the original (large) size from the constituent segments. Whereas there is a small negative impact on transmission efficiency, the positive impact on QoS for the other services sharing the transmission bandwidth will be more than compensatory. The size limit on packets need not be a hard specification. It can be chosen based on the bandwidth of the link, and with adequate network management communication between nodes, can be made variable to match the level of congestion on a dynamic basis; the size limit can be quite large during times of low traffic and can be made small during times of high congestion (the last statement may seem counterintuitive since smaller packet sizes correspond to lower efficiency which may in-turn be viewed as a mechanism for increasing congestion). Clearly, the method of using packet segmentation for improving QoS can be used in conjunction with either, or both, of priority-based queue management as well as scheduling.

The principle of packet segmentation has also been used to aggregate multiple transmission links to appear as a single pipe. This technique, one implementation of which is called MLPPP (Multi-Link Point-to-Point Protocol), see [Ref. 2.1], has been described in the literature. The intent of segmentation therein is to allow a large packet to the broken up for transmission on multiple physical links. The impact of using the same technique on a single link, with the concomitant improvement in QoS, has not been recognized.

Time-Division-Multiplexing Differentiated Services

The inter-machine trunk is provided over a digital bit-stream. Common examples of the Layer-1 (often the actual physical medium) for providing the inter-machine trunk are DS1, E1, SONET, SDH, and so on. All these formats are substantially synchronous transmission schemes that include overhead bits for framing and other purposes such as a data channel for carrying link management information and performance monitoring. We shall use the DS1 format for this example, though the general method is applicable to all schemes that can provide multiple channels based on time-division multiplexing.

DS1 is a well-known digital format. For the purposes of this discussion, the following attributes of the DS1 bit-stream are relevant. The line bit-rate is 1.544 Mbps of which 8 kbps is allocated to overhead and 1.536 Mbps allocated to the payload. The overhead framing pattern provides a marker to identify DS1-frames comprising intervals of 125 microseconds, or, equivalently, a DS1-frame-rate of 8 kHz. The DS1-frame (125 microseconds) comprises 193 bits of which 1 bit is the framing (overhead) bit and the remaining 192 bits are the payload. The 192 payload bits can be viewed as 24 octets. In the original application of DS1 framing, the 24 octets per frame were associated with 24 voice channels, each octet representing one sample of a voice channel. It is quite common to associate N octets with one channel, corresponding to a channel bit-rate of N×64 kbps and the remaining (24−N) octets with a second channel, corresponding to a channel bit-rate of (24−N)×64 kbps.

Similarly, E1 is a well-known digital format. For the purposes of this discussion, the following attributes of the E1 bit-stream are relevant. The line bit-rate is 2.048 Mbps of which 64 kbps is allocated to overhead and 1.984 Mbps allocated to the payload. The overhead framing pattern provides a marker to identify E1-frames comprising intervals of 125 microseconds, or, equivalently, an E1-frame-rate of 8 kHz. The E1-frame (125 microseconds) comprises 32 octets of which 1 octet is the framing (overhead) bit and the remaining 31 octets are the payload. In the original application of E1 framing, the 31 payload octets per frame were associated with 30 voice channels, each voice channel allocated one octet per frame with one octet allocated for signaling purposes. It is quite common to associate N octets with one channel, corresponding to a channel bit-rate of N×64 kbps and the remaining (31−N) octets with a second channel, corresponding to a channel bit-rate of (31−N)×64 kbps.

A similar discussion can be had for other transmission formats. The key attribute, for this discussion, is the ability to use time-division-multiplexing to "split" the transmission payload into two distinct channels.

Figure 9:
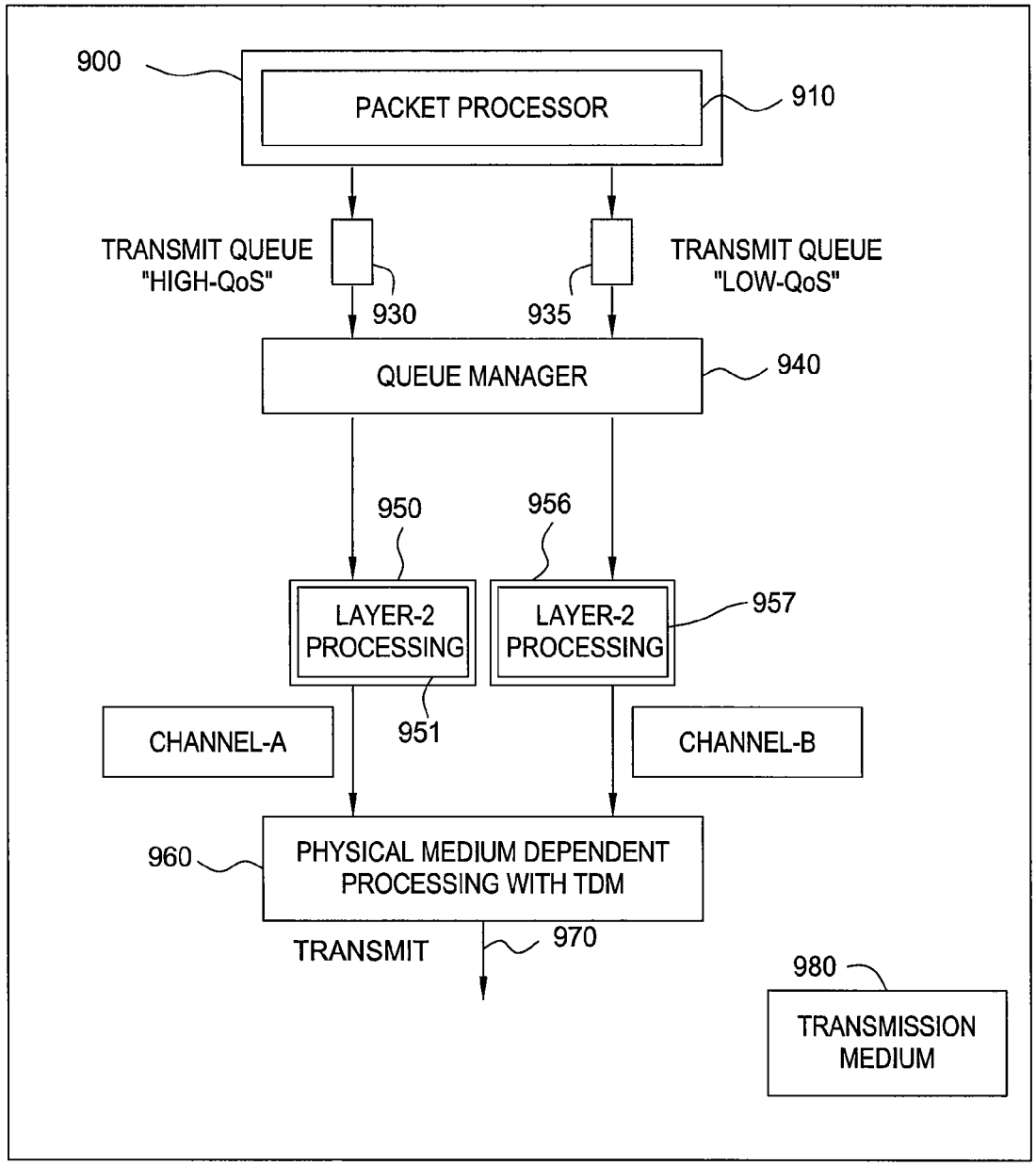
FIG. 9 illustrates a schematic block diagram of a transmit side of WAN link interface of a packet switch (router) showing the dual-queue/dual-channel structure employing time division multiplexing (TDM) for providing differentiated quality of service, representing an embodiment of the invention.

A simplified block diagram indicating the method for providing differentiated QoS using time-division-multiplexing is depicted in FIG. 9. Referring to FIG. 9, a packet router 900 includes a packet processor 910. The packet router 900 is coupled to both a high-quality of service transmit queue block 930 and a low-quality of service queue block 935. The high-quality of service transmit queue block 930 and the low-quality of service queue block 935 are coupled to a queue manager block 940. The queue manager block 940 is coupled to both a high-quality of service layer-2 block 950 and the low-quality of service layer-2 block 956. The high-quality of service layer-2 block 950 includes a high-quality of service layer-2 processing block 951. The low-quality of service layer-2 block 956 includes a low-quality of service layer-2 processing block 957. Both the high-quality of service layer-2 block 950 and the low-quality of service layer-2 block 956 are coupled to a physical medium dependent processing time division multiplexing block 960. The physical medium dependent processing block 960 transmits signals 970 via an associated transmission medium 980 and receives signals (not shown) via the associated transmission medium 980.

Conventional approaches are implemented to separate the packets from the two general classes corresponding to "High-QoS" and "Low-QoS". It is important to note in FIG. 9 manner in which the packets are handled at the Layer-2 and Layer-1 levels. The method here requires that the Layer-2 formatting be done independently for the two queues, generating distinct data streams labeled as Channel-A and Channel-B in FIG. 9. The sum of the bit-rates of the two channels is equal to the (used) payload of the transmission channel. The Physical Medium Dependent block now includes the time-division multiplexing function to combine the two bit-streams into the transmit payload.

Whereas only the transmit direction is depicted in FIG. 9, the receive direction is the simply the dual (often called the reverse or inverse) of the transmit side and is not elaborated upon here.

The method derives its efficacy from the allocation of a separate channel for the High-QoS packets and thus these are unaffected by the size, rate, or other characteristics of packets in the Low-QoS streams that are carried in the other channel. Whereas one apparent drawback is that the High-QoS channel bandwidth is "wasted" if the high-QoS queue is empty, this so-called deficiency is more than compensated for by the preservation of QoS of the packet streams that need this feature. Furthermore, if the overall traffic pattern is analyzed and it is determined that there is a paucity of traffic requiring High-QoS treatment, it is quite acceptable for the Queue Manager to direct even some Low-QoS packets towards the High-QoS channel (i.e., channel A). Likewise, if there is significant congestion in the High-QoS streams, the Queue Manager can direct some High-QoS packets towards the Low-QoS channel.

A suitable allocation of bandwidth between the High-QoS and Low-QoS streams is to assign roughly 12.5% of the transmission payload to the High-QoS stream. For a T1 link, this corresponds to about 3 DS0s for the High-QoS and 21 DS0s for the Low-QoS channels, respectively; in the case of an E1 link, 4 DS0s can be allocated to the High-QoS channel and 27 DS0s to the Low-QoS channel. These assignments are reasonable but arbitrary. Traffic engineering analyses, which establish the general traffic pattern, should be used for the actual allocation.

It should be noted that all the other prior art methods, including prioritization, scheduling, and packet fragmentation (segmentation) can be used in conjunction with the time-division-multiplexing applied to the physical medium. Furthermore, whereas clearly more than two channels will provide a finer resolution in quality of service, providing two channels appears to be the best compromise between service differentiation and efficiency of bandwidth utilization.

Cell-Based-Statistical-Multiplexing Differentiated Services

As mentioned before, the Inter-Machine trunk is provided over a digital bit-stream and common examples of the Layer-1 (often the actual physical medium) for providing the inter-machine trunk are DS1, E1, SONET, SDH, and so on. All these formats are substantially synchronous transmission schemes that include overhead bits for framing and other purposes such as a data channel for carrying link management information and performance monitoring. It is also well known that such links are appropriate for transporting cells, exemplified by ATM (Asynchronous Transfer Mode) methodologies. Considering that the end-points of the physical (Layer-1) link are predetermined and the Inter-Machine trunk is a point-to-point link between routers, it is possible to envisage a proprietary format for cells. However, we have chosen to specify ATM because of the availability of components (chips and integrated circuits) as well as software ("stacks") for ATM. Another reason for choosing ATM is that it becomes easier to network routers at the Layer-2 level using ATM Switches and use Permanent Virtual Circuits (PVCs) to get the same effect as point-to-point links without resorting to dedicated facilities.

ATM is a well-known technology. For the purposes of this discussion, the following attributes of ATM are relevant. As a Layer-2 format, the traffic (information) bits/octets are organized as cells. Each cell is a fixed length, 53 octets, of which 48 octets comprise the payload and 5 octets comprise the header (i.e. the overhead). The header contains a field called the VPI/VCI (Virtual Path Identifier/Virtual Circuit Identifier) that provides information regarding the destination of the cell. The VPI/VCI is used to identify the PVC to which the cell is associated. Information in the header can flag the cell as being non-traffic, such as an idle cell or an OAM cell, and so on.

A physical bit-stream can be used to carry multiple PVCs, thereby implementing a statistical multiplexing arrangement. ATM is well suited for QoS differentiation and it is common to assign different service classes to different PVCs. For example, the acronyms CBR, VBR-RT, VBR, ABR are used. CBR, for "constant bit rate" is the highest service class and is appropriate for carrying (substantially synchronous) bit-streams, such as DS0s and DS1s across an ATM network. Next is VBR-RT for "variable-bit-rate-real-time", suitable for carrying services like voice (substantially real-time, but may have "gaps" associated with silence as well variable bit-rate encoding associated with compression schemes such as variable-bit-rate-ADPCM). VBR (variable bit-rate) and ABR (available bit-rate) classes are generally used for data ("Low" QoS streams as defined in this document).

Figure 10:
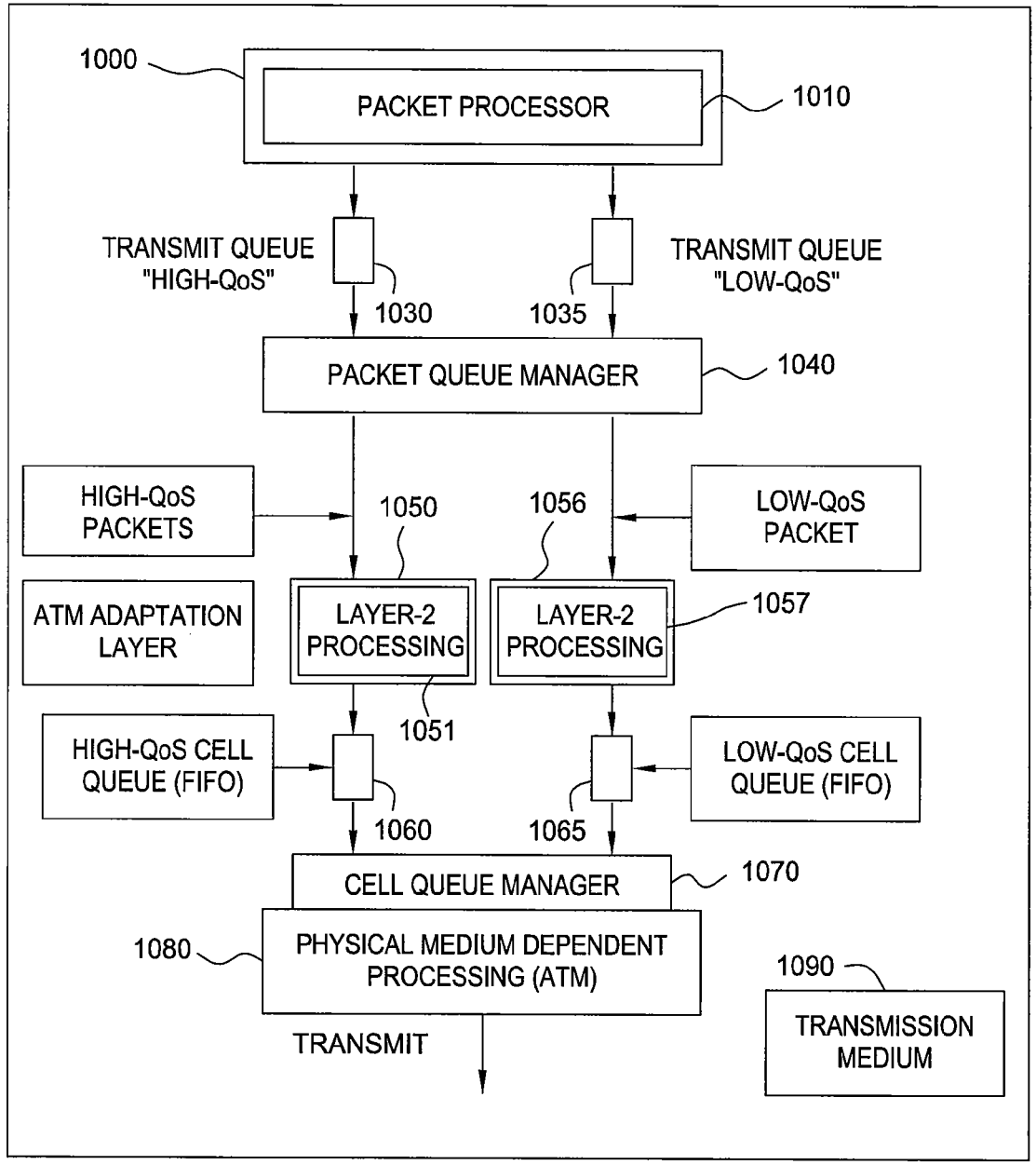
FIG. 10 illustrates a schematic block diagram of a transmit side of WAN link interface of a packet switch (router) showing the dual-queue/dual-channel structure employing asynchronous transfer mode (ATM) permanent-virtual-circuits (PVCs) for providing differentiated quality of service, representing an embodiment of the invention.

A similar discussion can be had for other cell-based formats. The key attributes, for this discussion, are the ability to use cell-based-multiplexing to "split" the transmission payload into two distinct cell-streams with distinct priority levels. The structure of the WAN link of a router using cell-based statistical multiplexing for providing differentiated services is depicted in FIG. 10. Only the transmit side is shown since the receive side is the logical "inverse" (or dual) of the transmit side.

A simplified block diagram indicating the method for providing differentiated QoS using cell-based multiplexing is depicted in FIG. 10. Referring to FIG. 10, a packet router 1000 includes a packet processor 1010. The packet router 1000 is coupled to both a high-quality of service transmit queue block 1030 and a low-quality of service queue block 1035. The high-quality of service transmit queue block 1030 and the low-quality of service queue block 1035 are coupled to a queue manager block 1040. The queue manager block 1040 is coupled to both a high-quality of service layer-2 block 1050 and a low-quality of service layer-2 block 1056. The high-quality of service layer-2 block 1050 includes a high-quality of service layer-2 processing block 1051. The low-quality of service layer-2 block 1056 includes a low-quality of service layer-2 processing block 1057. The high-quality of service layer-2 block 1050 is coupled to a high-quality of service queue 1060. The low-quality of service layer-2 block 1056 is coupled to a low-quality of service queue 1065. Both the high-quality of service queue 1060 and the low-quality of service queue 1065 should be first-in-first-out buffers. Both the high-quality of service queue 1060 and the low-quality of service queue 1065 are coupled to a cell queue manager block 1070. The cell queue manager block 1070 is coupled to a physical medium dependent processing statistical multiplexing block 1080. The physical medium dependent processing statistical multiplexing block 1080 transmits signals via an associated transmission medium 1090 and receives signals (not shown) via the associated transmission medium 1090.

Conventional approaches are implemented to separate the packets from the two general classes corresponding to "High-QoS" and "Low-QoS". It is important to note in FIG. 10 the manner in which the packets are handled at the Layer-2 and Layer-1 levels. The method here requires that the Layer-2 formatting be done independently for the two queues, generating distinct cell streams. The Layer-2 Processing block in FIG. 10 corresponds to the AAL (ATM Adaptation Layer) whereby packets are reformatted into (possibly a multiplicity of) cells. The ATM cells are distinguished, between the two streams, using the VPI/VCI mechanism. Thus the two streams appear as two PVCs to be transported over the physical layer bit-stream. The sum of the bit-rates of the two PVCs is nominally equal to the (used) payload of the transmission channel. The Physical Medium Dependent block now includes the cell-division multiplexing function to combine the two cell-streams into the transmit payload. The Cell Queue Manager block, performs the function of deciding which cell to send next and this choice is based on priority. A simple algorithm is to choose the next cell from the High-QoS cell queue and if the queue is empty, to choose a cell from the Low-QoS cell queue. If both queues are empty, the Physical Medium Dependent processing block will insert idle cells to maintain the requisite payload bit-rate. Note that in contrast to the Packet Queues, the Cell Queues must be FIFO.

The method derives its efficacy from the allocation of a separate PVC for the High-QoS packets and thus these are unaffected by the size, rate, or other characteristics of packets in the Low-QoS streams that are carried in the other PVC. Whereas one apparent drawback of the time-division-multiplexed scheme is that the High-QoS channel bandwidth is "wasted" if the high-QoS queue is empty, this so-called deficiency is overcome in the cell-based multiplexing scheme that, automatically, assigns transmit bandwidth to the Low-QoS scheme if there are no High-QoS cells available for transmission. Whereas ATM has been denigrated for being "inefficient" because of the "cell-tax" of 5 overhead octets for every 48 octets of payload, this so-called deficiency is more than compensated for by the preservation of QoS of the packet streams that need this feature. The statistical multiplexing nature of ATM provides an automatic load balancing of bandwidth between the High-QoS and Low-QoS streams.

Sophisticated ATM Cell Queue Manager functionality can be hypothesized. However, it is known the generally available ATM stacks will provide several useful features. For example, it is possible to assign different priorities to different queues (PVCs). It is also possible to designate the nominal speed (effective bit-rate) for a PVC as well set a minimum and maximum bit-rate. In the situation considered here, it is useful to set the sum of the nominal bit-rates of the two PVCs to correspond to the payload rate of the physical medium and to set the maximum bit-rate to a convenient level. Clearly the maximum bit-rate can be no more than the payload capacity of the physical medium.

A suitable allocation of (nominal) bandwidth between the High-QoS and Low-QoS PVCs is to assign roughly 12.5% of the transmission payload to the High-QoS PVC. For a T1 link, this corresponds to about 3 DS0s for the High-QoS and 21 DS0s for the Low-QoS PVCs, respectively; in the case of an E1 link, 4 DS0s can be allocated to the High-QoS PVC and 27 DS0s to the Low-QoS PVC. In both cases it is a good practice to set a maximum bit-rate, especially for the High-QoS PVC, and half the payload (12 DS0s in T1, 15 DS0s in E1) seems appropriate for the High-QoS PVC. These assignments are reasonable but arbitrary. Traffic engineering analyses, which establish the general traffic pattern, should be used for the actual allocation.

It should be noted that all the other prior art methods, including prioritization and scheduling, can be used in conjunction with the cell-based-statistical-multiplexing applied to the physical medium. Whereas packet fragmentation is not contraindicated, the efficacy is less evident since the reformatting into ATM cells achieves the fragmentation required. Furthermore, whereas clearly more than two PVCs will provide a finer resolution in quality of service, providing two PVCs appears to be the best compromise between service differentiation and implementation complexity.

Whereas we have advocated the use of dual PVCs for Inter-Machine trunks where the two ends of the physical medium terminate on the routers the medium is interconnecting, the principle can be extended to entire IP Networks. In particular, an IP Network can be viewed as a collection of routers interconnected by trunks. Such inter-router links can be provided by an (at a lower layer) ATM Network in the form of ATM PVCs. That is, the Layer-2 mechanism used in the routers is ATM, and the VPI/VCI mechanism utilized to identify the destination of cells. In this model, it is possible for a router to have a single physical medium interface and have multiple PVCs transported over that medium. ATM Switches are used to segregate and redirect PVCs to the appropriate destination. This approach is well known, but traditional implementations have allocated one PVC between each pair of inter-connected routers. The scheme described here advocates the use of two PVCs between each pair of inter-connected routers. One PVC will be generally of lower bit-rate but have a higher assigned priority and will carry the High-QoS cells; the other PVC will be generally of higher bit-rate but lower assigned priority and will carry the Low-QoS cells.

Frame-Based-Statistical-Multiplexing Differentiated Services

As mentioned before, the Inter-Machine trunk is provided over a digital bit-stream and common examples of the Layer-1 (often the actual physical medium) for providing the inter-machine trunk are DS1, E1, SONET, SDH, and so on. All these formats are substantially synchronous transmission schemes that include overhead bits for framing and other purposes such as a data channel for carrying link management information and performance monitoring. It is also well known that such links are appropriate for transporting frames, exemplified by HDLC (High-level-Data-Link-Control, used in Frame-Relay) methodologies. Considering that the endpoints of the physical (Layer-1) link are predetermined and the Inter-Machine trunk is a point-to-point link between routers, it is possible to envisage a proprietary format for frames. We have chosen to specify HDLC because of the availability of components (chips and integrated circuits) as well as software ("stacks") for Frame-Relay. Another reason for choosing HDLC is that it becomes easier to network routers at the Layer-2 level using Frame-Relay Switches and use Permanent Virtual Circuits (PVCs) to get the same effect as point-to-point links without resorting to dedicated facilities.

Figure 2:
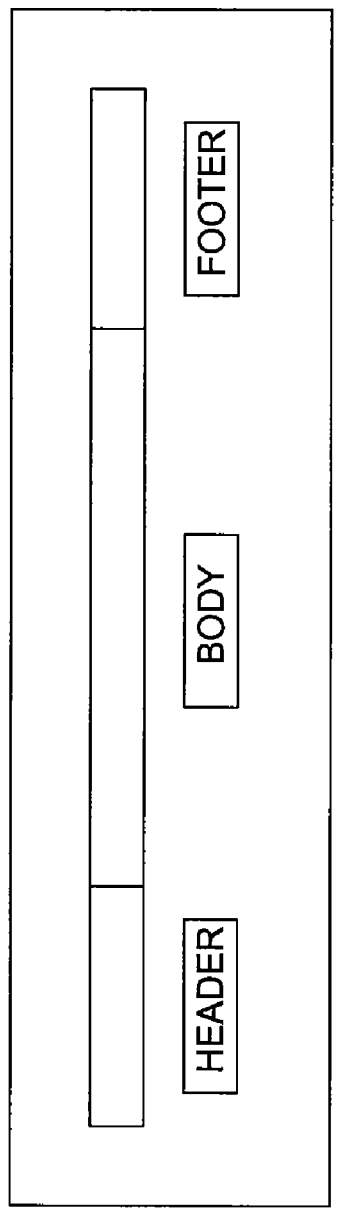
FIG. 2 illustrates a schematic view of a conventional generic packet structure, appropriately labeled "PRIOR ART."
Figure 3:
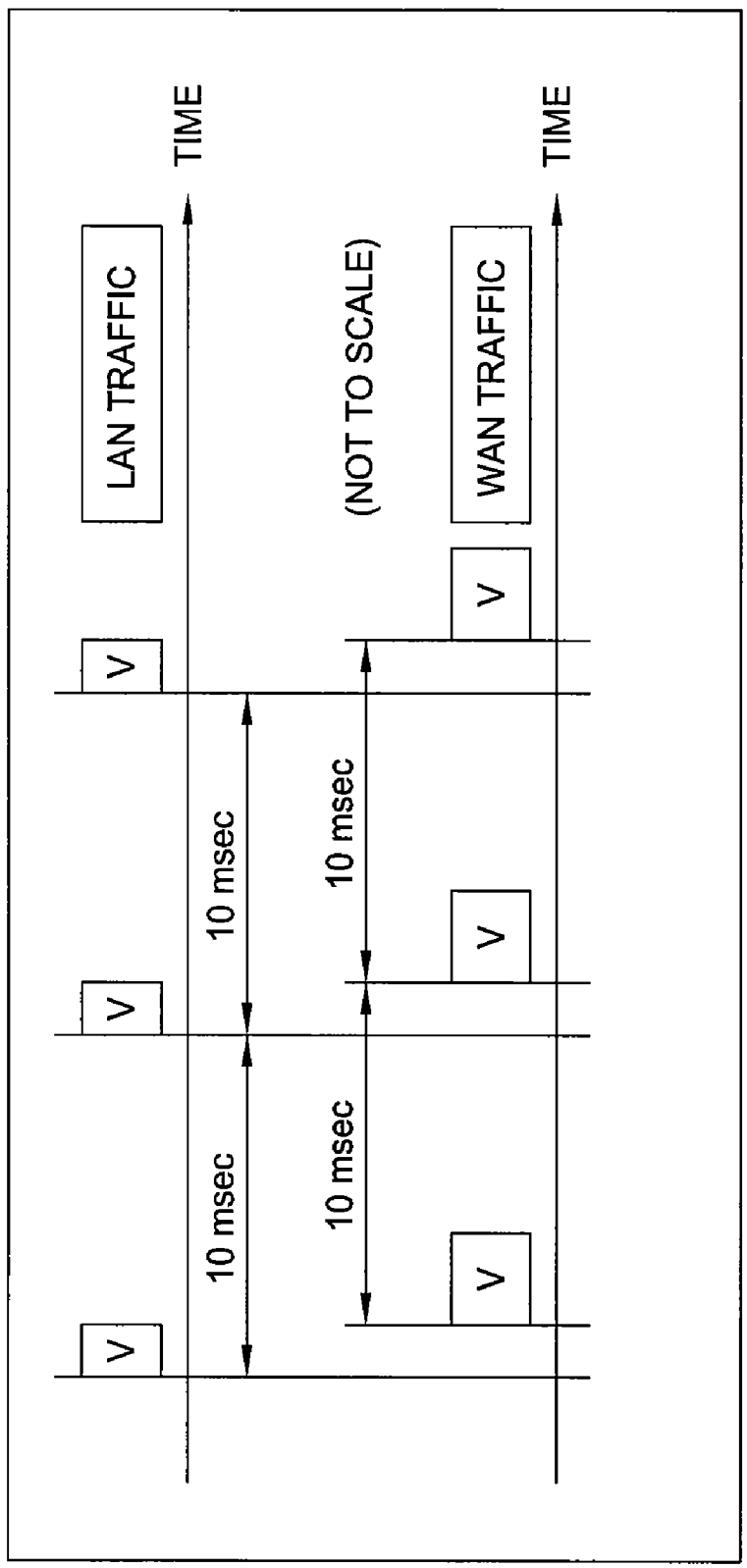
FIG. 3 illustrates a schematic time-event depiction a conventional movement of voice packets, appropriately labeled "PRIOR ART."
Figure 4:
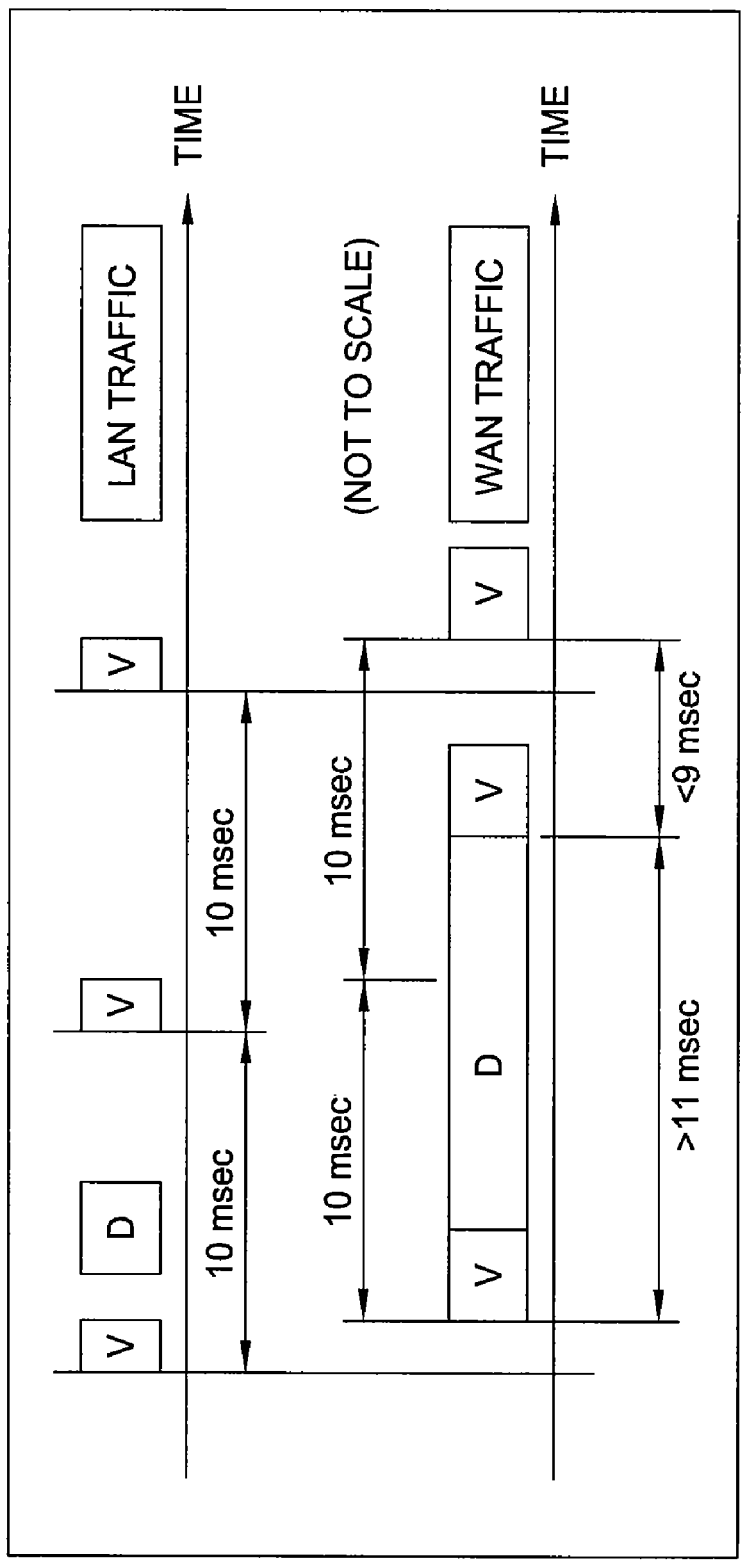
FIG. 4 illustrates a schematic time-event depiction of a conventional movement of voice packets with one data packet inserted, appropriately labeled "PRIOR ART."
Figure 5:
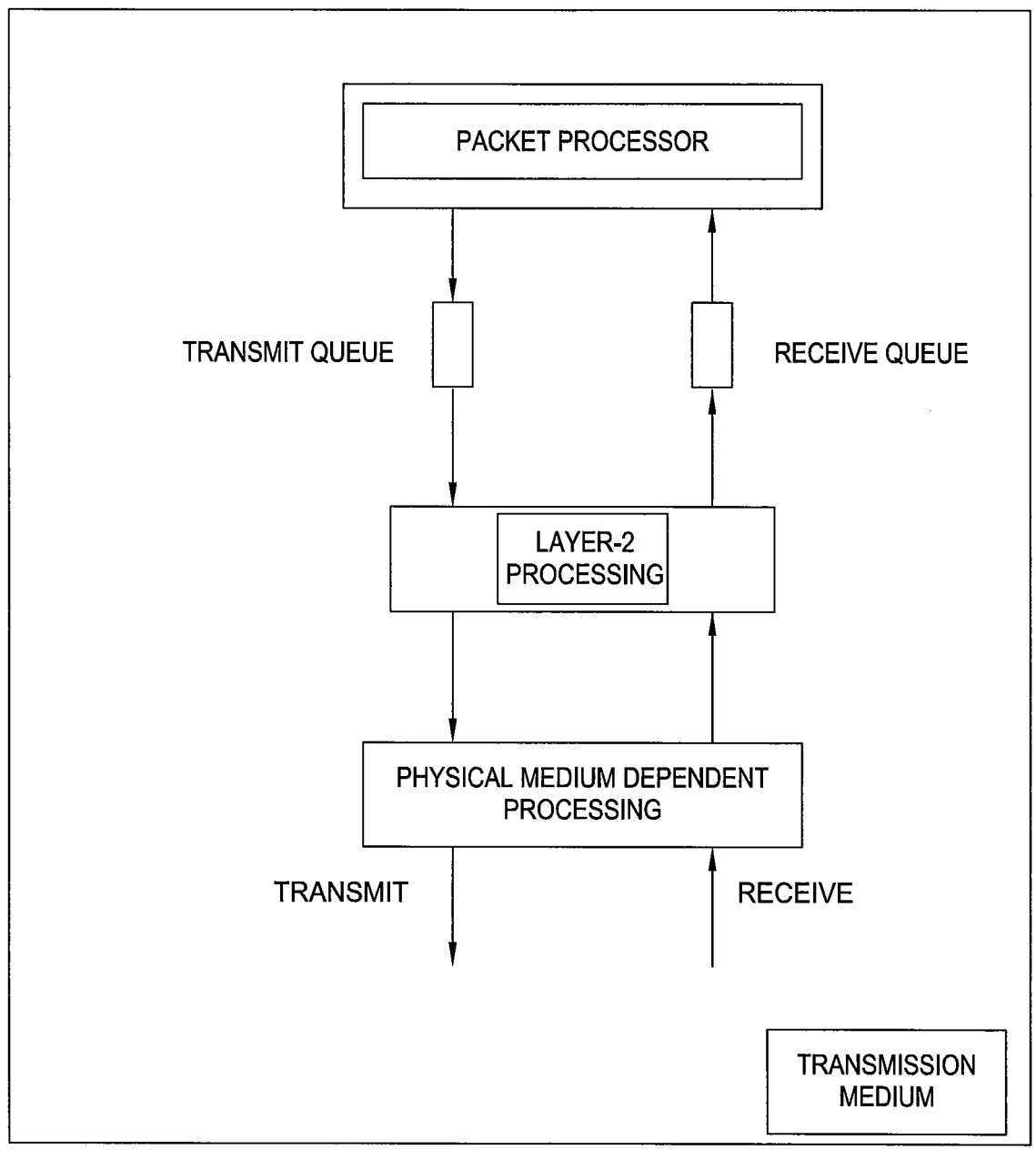
FIG. 5 illustrates a schematic block diagram of a conventional wide area network (inter-machine-trunk) link interface of a packet switch (router), appropriately labeled "PRIOR ART."

Frame-Relay is a well-known technology. For the purposes of this discussion, the following attributes of Frame-Relay are relevant. As a Layer-2 format, the traffic (information) bits/octets are organized as HDLC frames. Each frame does not necessarily have a fixed length, but has a structure similar to a packet (see FIG. 2) comprising a header, the main body (payload), and a trailer. The header contains a field that provides information regarding the destination of the cell. This is similar to the VPI/VCI in an ATM header is used to identify the PVC to which the cell is associated. The notion of an idle unit is the flag octet. Care is taken, by inserting "0" bits into the frame, that the flag pattern is not mimicked by data. A physical bit-stream can be used to carry multiple PVCs, thereby implementing a statistical multiplexing arrangement.

The variability in frame size can be problematic from the viewpoint of impact on QoS. However, standards have been developed to allow for frame segmentation. That is, the methods for breaking up a large frame into smaller frames (with the same priority and destination as the large frame) in a manner that permits the reconstruction of the large frame at the receiving end, are well known. This frame segmentation was first developed to allow for inverse multiplexing, permitting a high bit-rate PVC to be transported over a multiplicity of low bit-rate physical links.

It turns out that segmentation is beneficial for QoS as well. See, for example, [Ref. 3.3 through 3.6].

Figure 11:
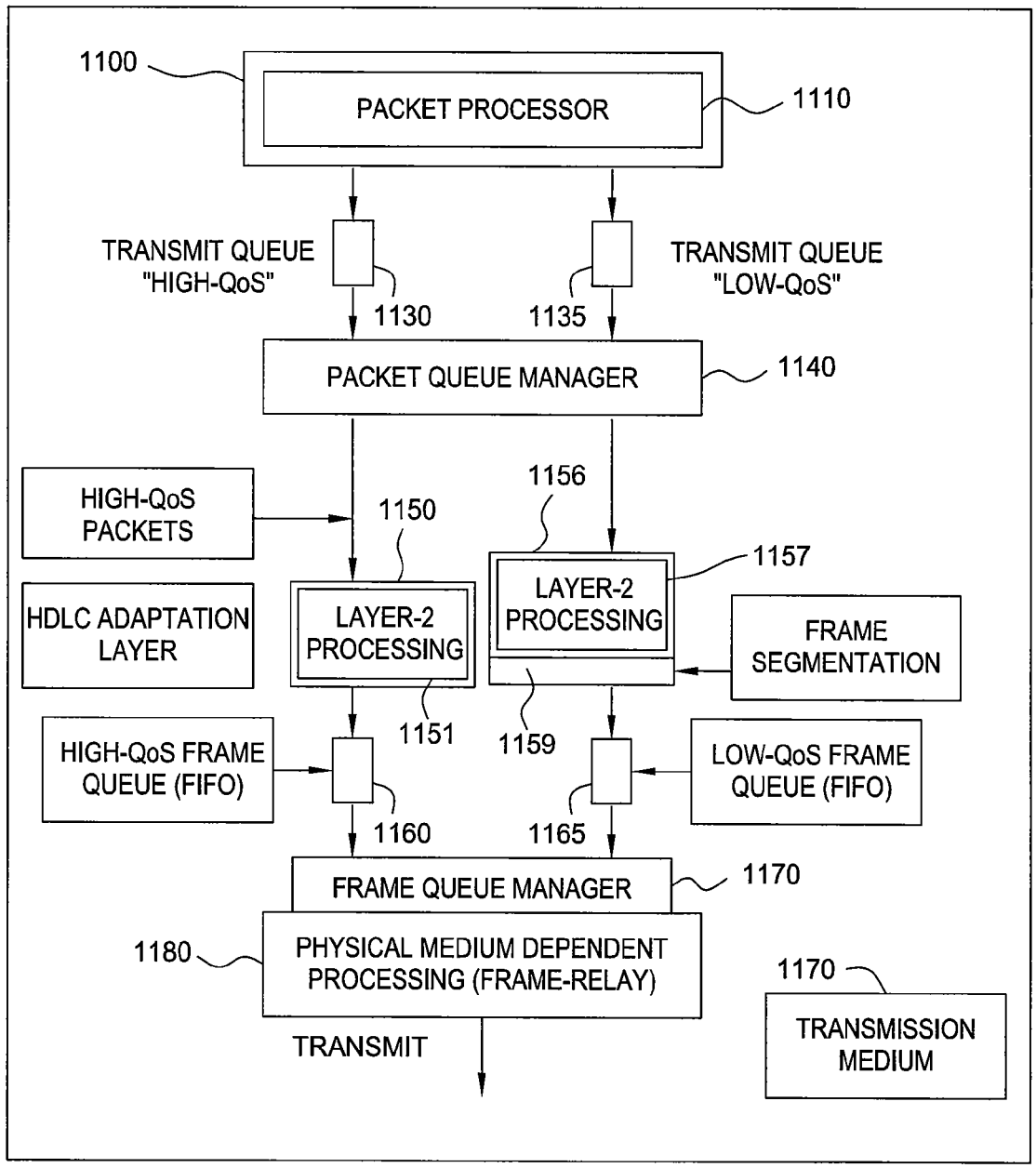
FIG. 11 illustrates a schematic block diagram of a transmit side of WAN link interface of a packet switch (router) showing the dual-queue/dual-channel structure employing frame-relay PVCs for providing differentiated quality of service that can be implemented by hardware and/or software, representing an embodiment of the invention.

A similar discussion can be had for other data link formats. The key attributes, for this discussion, are the ability to use frame-based-multiplexing to "split" the transmission payload into two distinct frame-relay-streams with distinct priority levels. The structure of the WAN link of a router using frame-based statistical multiplexing for providing differentiated services is depicted in FIG. 11. Only the transmit side is shown since the receive side is the logical "inverse" (or dual) of the transmit side.

A simplified block diagram indicating the method for providing differentiated QoS using frame-based multiplexing is depicted in FIG. 11. Referring to FIG. 11, a packet router 1100 includes a packet processor 1110. The packet router 1100 is coupled to both a high-quality of service transmit queue block 1130 and a low-quality of service queue block 1135. The high-quality of service transmit queue block 1130 and the low-quality of service queue block 1135 are coupled to a queue manager block 1140. The queue manager block 1140 is coupled to both a high-quality of service layer-2 block 1150 and a low-quality of service layer-2 block 1156. The high-quality of service layer-2 block 1150 includes a high-quality of service layer-2 processing block 1151. The low-quality of service layer-2 block 1156 includes a low-quality of service layer-2 processing block 1157. The low-quality of service layer-2 block 1156 may optionally include a frame segmentation block 1159. The high-quality of service layer-2 block 1150 is coupled to a high-quality of service queue 1160. The low-quality of service layer-2 block 1156 is coupled to a low-quality of service queue 1165. Both the high-quality of service queue 1160 and the low-quality of service queue 1165 should be first-in-first-out buffers. Both the high-quality of service queue 1061 and the low-quality of service queue 1165 are coupled to a frame queue manager block 1170. The frame queue manager block 1170 is coupled to a physical medium dependent processing statistical multiplexing block 1180. The physical medium dependent processing statistical multiplexing block 1180 transmits signals via an associated transmission medium 1190 and receives signals (not shown) via the associated transmission medium 1190.

Conventional approaches are implemented to separate the packets from the two general classes corresponding to "High-QoS" and "Low-QoS". It is important to note in FIG. 11 the manner in which the packets are handled at the Layer-2 and Layer-1 levels. The method here requires that the Layer-2 formatting be done independently for the two queues, generating distinct frame streams. The Layer-2 Processing block in FIG. 11 corresponds to the HDLC layer whereby packets are reformatted into (possibly a multiplicity of) frames. The use of frame segmentation for the Low-QoS stream is shown explicitly; it is optional for the High-QoS stream. The HDLC frames are distinguished, between the two streams, using the addressing mechanism available in the header. Thus the two streams appear as two PVCs to be transported over the physical layer bit-stream. The sum of the bit-rates of the two PVCs is nominally equal to the (used) payload of the transmission channel. The Physical Medium Dependent block now includes the frame-division multiplexing function to combine the two frame-streams into the transmit payload. The Frame Queue Manager block, performs the function of deciding which frame to send next and this choice is based on priority. A simple algorithm is to choose the next frame from the High-QoS frame queue and if the queue is empty, to choose a frame from the Low-QoS frame queue. If both queues are empty, the Physical Medium Dependent processing block will insert flags to maintain the requisite payload bit-rate.

The method derives its efficacy from the allocation of a separate PVC for the High-QoS packets and thus these are unaffected by the size, rate, or other characteristics of packets in the Low-QoS streams that are carried in the other PVC. Whereas one apparent drawback of the time-division-multiplexed scheme is that the High-QoS channel bandwidth is "wasted" if the high-QoS queue is empty, this so-called deficiency is overcome in the frame-based multiplexing scheme that, automatically, assigns transmit bandwidth to the Low-QoS scheme if there are no High-QoS frames available for transmission. Whereas HDLC has been denigrated for being "inefficient" because of the overhead octets, especially for small payloads, this so-called deficiency is more than compensated for by the preservation of QoS of the packet streams that need this feature. The statistical multiplexing nature of Frame-Relay provides an automatic load balancing of bandwidth between the High-QoS and Low-QoS streams.

Sophisticated Frame-Relay Queue Manager functionality can be hypothesized. However, it is known the generally available Frame-relay stacks will provide several useful features. For example, it is possible to assign different priorities to different queues (PVCs). It is also possible to designate the nominal speed (effective bit-rate) for a PVC as well set a minimum and maximum bit-rate. In the situation considered here, it is useful to set the sum of the nominal bit-rates of the two PVCs to correspond to the payload rate of the physical medium and to set the maximum bit-rate to a convenient level. Clearly the maximum bit-rate can be no more than the payload capacity of the physical medium.

A suitable allocation of (nominal) bandwidth between the High-QoS and Low-QoS PVCs is to assign roughly 12.5% of the transmission payload to the High-QoS PVC. For a T1 link, this corresponds to about 3 DS0s for the High-QoS and 21 DS0s for the Low-QoS PVCs, respectively; in the case of an E1 link, 4 DS0s can be allocated to the High-QoS PVC and 27 DS0s to the Low-QoS PVC. In both cases it is a good practice to set a maximum bit-rate, especially for the High-QoS PVC, and half the payload (12 DS0s in T1, 15 DS0s in E1) seems appropriate for the High-QoS PVC. These assignments are reasonable but arbitrary. Traffic engineering analyses, which establish the general traffic pattern, should be used for the actual allocation.

It should be noted that all the other methods, including prioritization, scheduling, and packet fragmentation can be used in conjunction with the frame-based-statistical-multiplexing applied to the physical medium. Furthermore, whereas clearly more than two PVCs will provide a finer resolution in quality of service, providing two PVCs appears to be the best compromise between service differentiation on the one hand and efficiency of bandwidth utilization and implementation complexity on the other.

Whereas we have advocated the use of dual PVCs for Inter-Machine trunks where the two ends of the physical medium terminate on the routers the medium is interconnecting, the principle can be extended to entire IP Networks. In particular, an IP Network can be viewed as a collection of routers interconnected by trunks. Such inter-router links can be provided by a (at a lower layer) Frame-Relay Network in the form of PVCs. That is, the Layer-2 mechanism used in the routers is HDLC, and the header-based addressing mechanism utilized to identify the destination of frames. In this model, it is possible for a router to have a single physical medium interface and have multiple PVCs transported over that medium. Frame-Relay Switches are used to segregate and redirect PVCs to the appropriate destination. This approach is well known, but traditional implementations have allocated one PVC between each pair of inter-connected routers. The scheme described here advocates the use of two PVCs between each pair of inter-connected routers. One PVC will be generally of lower bit-rate but have a higher assigned priority and will carry the High-QoS frames; the other PVC will be generally of higher bit-rate but lower assigned priority and will carry the Low-QoS frames.

Differentiated Services Networking Architectures

Figure 12:
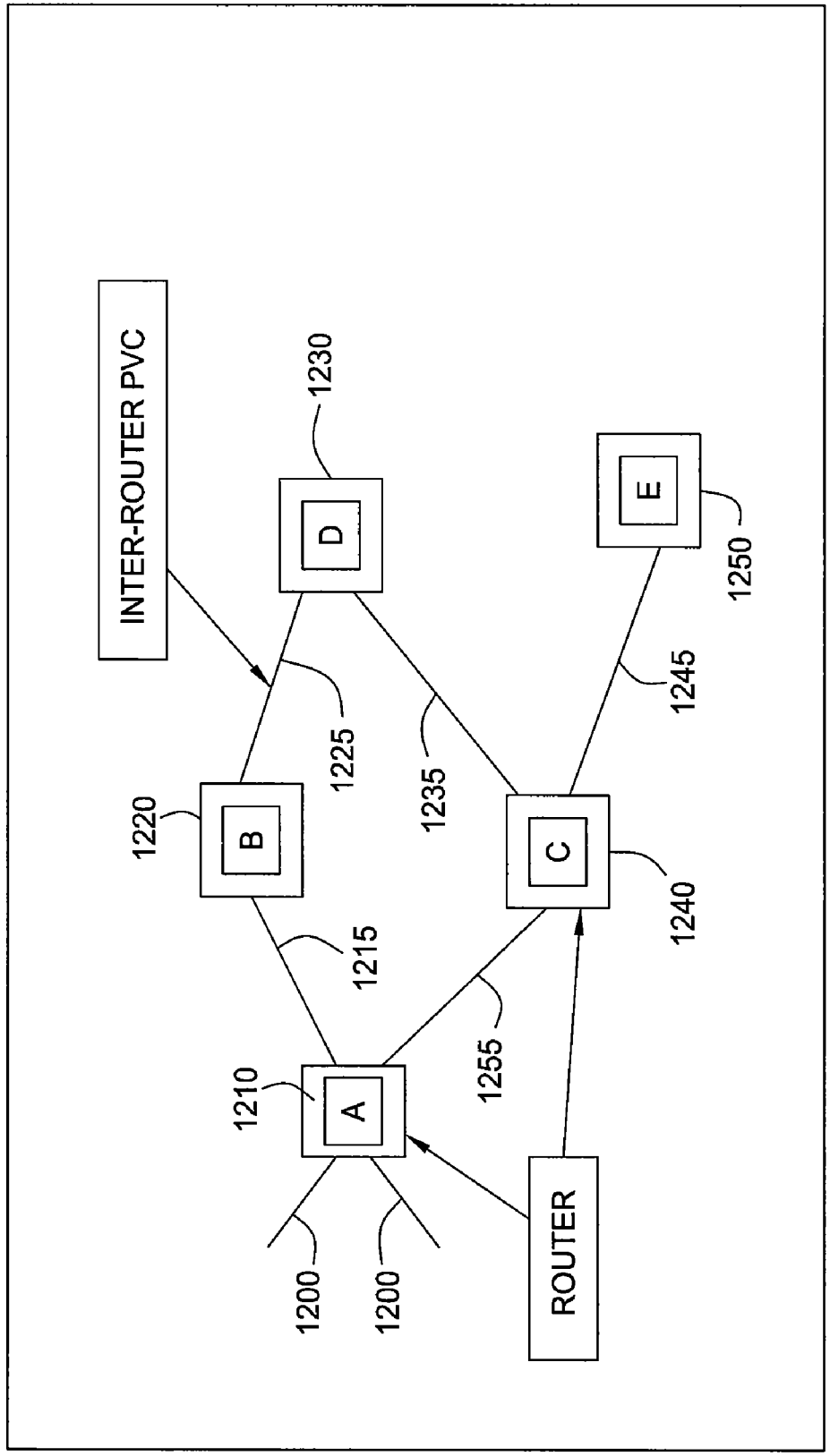
FIG. 12 illustrates a schematic diagram of a packet-switched (IP) network including multiple interconnected routers, each pair of routers having one circuit or permanent-virtual-circuit between them, representing an embodiment of the invention.

A simple depiction of a packet-switched network is depicted in FIG. 12. The network comprises multiple interconnected packet switches (i.e., routers). These interconnections can be provided in numerous ways. Referring to FIG. 12, in this example an A router 1210 is coupled to a B router 1220 via an inter-router permanent virtual circuit 1215. The B router 1220 is coupled to a D router 1230 via an inter-router permanent virtual circuit 1225. The D router 1230 is coupled to a C router 1240 via an inter-router permanent virtual circuit 1235. The C router 1240 is coupled to an E router 1250 via an inter-router permanent virtual circuit 1245. The C router 1240 is also coupled to the A router 1210 via an inter-router permanent virtual circuit 1255. The A router 1210 is provided with, in this example, two other connections 1200 than can couple the depicted network to other router(s) and/or network(s).

In some instances, the connection between a pair of routers is a Layer-1 link, wherein a bit-stream launched at one router is received, intact (other than differences arising from transmission errors), at the other router of the interconnected pair.

The underlying transmission network will view and manage these bit-streams as circuit-switched connections (or "circuits").

The "switching" elements are actually Cross-connect machines, such as DACS (Digital Access and Cross-connect System) and the bit-streams are typically DS0s (N×64 kbps channels), DS1s, or DS3s, or even higher bit-rate entities based on SONET/SDH (Synchronous Optical Network/Synchronous Digital Hierarchy).

In other instances the underlying transmission network can provide a Layer-2 switching function and the router interconnections can be viewed as Virtual Circuits (VCs) or Permanent Virtual Circuits (PVCs) (the notion of "permanent" is that these are set up and torn down relatively infrequently as opposed to in an "on-demand" basis like a common telephone call). Such Layer-2 networks utilize ATM switches or Frame-Relay switches to manage the PVCs.

It is important to note that in legacy and existing networks, there is usually just one direct link between any pair or routers. If two or more links are provided, these links are of peer status and function primarily as back-up for redundancy and/or load-sharing purposes.

In such existing architectures, differentiated services are provided using IP protocol suites such as DiffServ. That is, packets are assigned priority levels and "high priority" packets are given preferential treatment. An extension of this architecture utilizes time, typically traceable to UTC (Universal Coordinated Time, the global standard) or GPS (time associated with the Global Positioning Satellite system, which is also available worldwide), to define transmission schedules. Such scheduling guarantees a time window for high priority packets.

Figure 13:
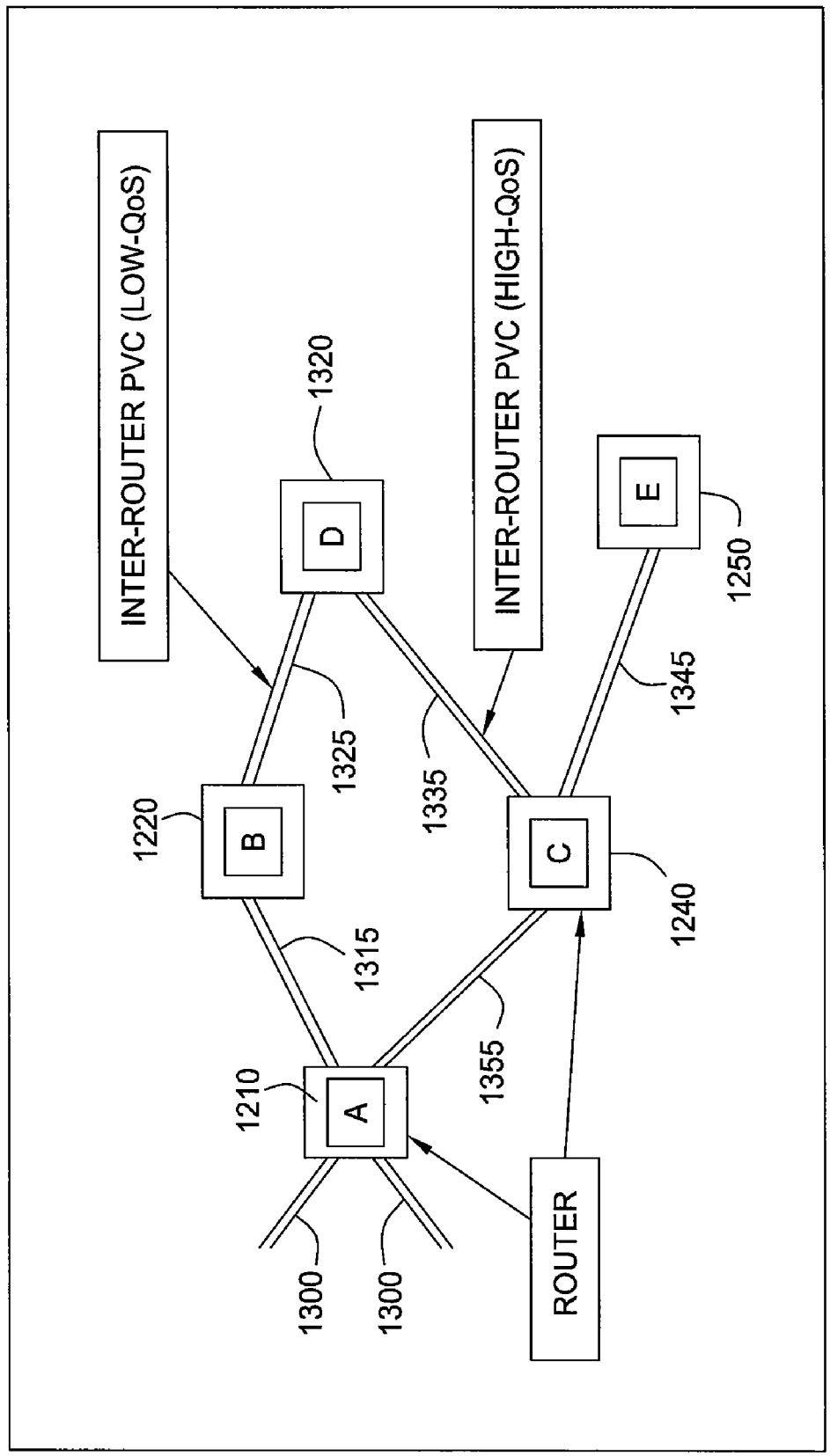
FIG. 13 illustrates a schematic diagram of a packet-switched (IP) network including multiple interconnected routers, each pair of routers having two circuits or permanent-virtual-circuits between them, representing an embodiment of the invention.

The methods for providing differentiated services described herein advocate the use of two PVCs (or two circuits) between each pair of connected routers. These are not peer links and do not provide load-sharing functionality in the traditional sense. Rather, one PVC is dedicated to High-QoS traffic and the other to Low-QoS traffic. Clearly more than two PVCs will provide a finer resolution in quality of service, but two appears to be the best compromise between service differentiation on the one hand and efficiency of bandwidth utilization and implementation complexity on the other. This is depicted in FIG. 13. Referring to FIG. 13, in this example the A router 1210 is coupled to the B router 1220 via a pair of inter-router permanent virtual circuits 1315. The B router 1220 is coupled to the D router 1230 via a pair of inter-router permanent virtual circuits 1325. The D router 1230 is coupled to the C router 1240 via a pair of inter-router permanent virtual circuits 1335. The C router 1240 is coupled to the E router 1250 via a pair of inter-router permanent virtual circuits 1345. The C router 1240 is also coupled to the A router 1210 via a pair of inter-router permanent virtual circuits 1355. The A router 1210 is provided with, in this example, two other pair of connections 1300 than can couple the depicted network to other router(s) and/or network(s).

The terms a or an, as used herein, are defined as one or more than one. The term plurality, as used herein, is defined as two or more than two. The term another, as used herein, is defined as at least a second or more. The terms "comprising" (comprises, comprised), "including" (includes, included) and/or "having" (has, had), as used herein, are defined as open language (i.e., requiring what is thereafter recited, but open for the inclusion of unspecified procedure(s), structure(s) and/or ingredient(s) even in major amounts. The terms "consisting" (consists, consisted) and/or "composing" (composes, composed), as used herein, close the recited method, apparatus or composition to the inclusion of procedures, structure(s) and/or ingredient(s) other than those recited except for ancillaries, adjuncts and/or impurities ordinarily associated therewith. The recital of the term "essentially" along with the terms "consisting" or "composing" renders the recited method, apparatus and/or composition open only for the inclusion of unspecified procedure(s), structure(s) and/or ingredient(s) which do not materially affect the basic novel characteristics of the composition. The term coupled, as used herein, is defined as connected, although not necessarily directly, and not necessarily mechanically. The term approximately, as used herein, is defined as at least close to a given value (e.g., preferably within 10% of, more preferably within 1% of, and most preferably within 0.1% of). The term substantially, as used herein, is defined as largely but not necessarily wholly that which is specified. The term generally, as used herein, is defined as at least approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer or computer system.

All the disclosed embodiments of the invention disclosed herein can be made and used without undue experimentation in light of the disclosure. The invention is not limited by theoretical statements recited herein. Although the best mode of carrying out the invention contemplated by the inventor(s) is disclosed, practice of the invention is not limited thereto. Accordingly, it will be appreciated by those skilled in the art that the invention may be practiced otherwise than as specifically described herein.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

All the disclosed elements and features of each disclosed embodiment can be combined with, or substituted for, the disclosed elements and features of every other disclosed embodiment except where such elements or features are mutually exclusive. Variation may be made in the steps or in the sequence of steps defining methods described herein.

Although the routers described herein can be a separate module, it will be manifest that the routers may be integrated into the (meta-)network with which they are associated. The individual components need not be combined in the disclosed configurations, but could be combined in all possible configurations.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

Data Communication and Networking

[1.1] Andrew S. Tanenbaum, Computer Networks, Third Edition, Prentice-Hall, 1996. ISBN 0-13-349945-6.
[1.2] Martin W. Murhammer, Orcun Atakan, Stefan Bretz, Larry R. Pugh, Kazunari Suzuki, and David H. Wood, TCP/IP Tutorial and Technical Overview, Sixth Edition, Prentice-Hall 1998, ISBN 0-13-020130-8.
[1.3] Framework for providing additional Packet Mode Bearer Services, CCITT Recommendation I.122, Blue Book.
[1.4] ISDN User-Network Interface—Data Link Layer Specification, ITU-T Recommendation Q.921, Geneva, 1997.
[1.5] ISDN Data Link Layer Specification for Frame Mode Bearer Services, ITU-T Recommendation Q.922, Geneva, 1993.

Related Documents from Internet Engineering Task Force (IETF) (see www.ietf.org)

[2.1] The PPP Multilink Protocol (MP), IETF Request for Comment, RFC 1990.
[2.2] Resource Reservation Protocol (RSVP)—Version 1 Functional Specification, IETF Request for Comment, RFC 2205.
[2.3] Specification of the Controlled-Load Network Element Service, IETF Request for Comment, RFC 2211.
[2.4] Specification of Guaranteed Quality of Service, IETF Request for Comment, RFC 2212.
[2.5] Layer Two Tunneling Protocol "L2TP", IETF Request for Comment, RFC 2661.

Differentiated Services in an IP Environment (see www.ietf.org)

[3.1] Differentiated Services Quality of Service Policy Information Base, (http://www.ietf.org/internet-drafts/draft-IETF-diffserv-pib-09.txt)
[3.2] Definition of the Differentiated Services Field (DS Field) in the IPv4 and IPv6 Headers, IETF Request for Comment, RFC 2474.
[3.3] An Architecture for Differentiated Services, IETF Request for Comment, RFC 2475.
[3.4] An Expedited Forwarding PHB, IETF Request for Comment, RFC 2598.
[3.5] Assured Forwarding PHB Group, IETF Request for Comment, RFC 2597.
[3.6] Per Hop Behavior Identification Codes, IETF Request for Comment, RFC 2836.
[3.7] Differentiated Services and Tunnels, IETF Request for Comment, RFC 2983.
[3.8] Definition of Differentiated Services Per Domain Behaviors and Rules for their Specification, IETF Request for Comment, RFC 3086.
[3.9] Per Hop Behavior Identification Codes, IETF Request for Comment, RFC 3140.
[3.10] An Expedited Forwarding PHB, IETF Request for Comment, RFC 3246.
[3.11] Supplemental Information for the New Definition of the EF PHB, IETF Request for Comment, RFC 3247.
[3.12] A Delay Bound alternative revision of RFC2598, IETF Request for Comment, RFC 3248.
[3.13] New Terminology and Clarification for Diffserv, IETF Request for Comment, RFC 3260.
[3.14] Management Information Base for the Differentiated Services Architecture, IETF Request for Comment, RFC 3289.
[3.15] An Informal Management Model for Diffserv Routers, IETF Request for Comment, RFC 3290.

Scheduling Approach to Providing Quality of Service

[4.1] U.S. Pat. No. 6,038,230, Packet switching with common time reference over links with dynamically varying delays, Issued Mar. 14, 2000.
[4.2] U.S. Pat. No. 6,259,695, Packet telephone scheduling with common time reference, Issued Jul. 10, 2001.
[4.3] U.S. Pat. No. 6,272,131, Integrated data packet network using a common time reference, Issued Aug. 7, 2001.
[4.4] U.S. Pat. No. 6,272,132, Asynchronous packet switching with common time reference, Issued Aug. 7, 2001.
[4.5] U.S. Pat. No. 6,330,236, Packet switching method with time-based routing, Issued Dec. 11, 2001.
[4.6] U.S. Pat. No. 6,377,579, Interconnecting a synchronous switching network that uses a common time reference with an asynchronous switching network, Issued Apr. 23, 2002.
[4.7] U.S. Pat. No. 6,385,198, Signaling for timely forwarding in packet switching network with a common time reference, Issued May 7, 2002.

ATM Networking

[5.1] Walter J. Goralski, Introduction to ATM Networking, McGraw-Hill Series on Computer Communications, 1995. ISBN 0-07-024043-4.
[5.2] David McDysan and Darren Spohn, ATM Theory and Applications, McGraw-Hill Series on Computer Communications, 1999. ISBN 0-07-045346-2.
{Appendix B of [5.2], titled "ATM Standards and Specifications Reference" provides a comprehensive list of standards and where they apply}
[5.3] B-ISDN ATM Adaptation Layer Specification: Type 1 AAL, ITU-T Recommendation 1.363.1, Geneva, 1996.
[5.4] Segmentation and Reassembly Service Specific Convergence Sublayer for AAL Type 2, ITU-T Recommendation 1.366.1, Geneva, 1998.
[5.5] AAL Type 2 Service Specific Convergence Sublayer for Narrowband Services, ITU-T Recommendation 1.366.2, Geneva, 2000.
[5.6] B-ISDN User-Network Interface—Physical Layer: General Characteristics, ITU-T Recommendation 1.432.1, Geneva, 1999.
[5.7] B-ISDN User-Network Interface—Physical Layer Specification: 1544 and 2048 kbit/s operation, ITU-T Recommendation 1.432.3.
[5.8] ATM on Fractional E1/T1, The ATM Forum Technical Committee, AF-PHY-0130.00, October 1999.

Frame-Relay Networking

[6.1] PVC User-to-Network Interface (UNI) Implementation Agreement, Frame Relay Forum, FRF.1.2.
[6.2] PVC Network-to-Network Interface (NNI) Implementation Agreement, Frame Relay Forum, FRF.2.2.
[6.3] Frame Relay Fragmentation Implementation Agreement, Frame Relay Forum, FRF.12.
[6.4] Physical Layer Interface Implementation Agreement, Frame Relay Forum, FRF.14.
[6.5] End-to-End Multilink Frame Relay Implementation Agreement, Frame Relay Forum, FRF.15.
[6.6] Multilink Frame Relay UNI/VNI Implementation Agreement, Frame Relay Forum, FRF.16.1.

Synchronous Transmission Channels (and voice encoding)

[7.1] Digital hierarchy bit rates, CCITT Recommendation G.702, Blue Book.
[7.2] Physical/electrical characteristics of hierarchical digital interfaces, CCITT Recommendation G.703, Blue Book.
[7.3] Synchronous frame structures used at primary and secondary hierarchical levels, CCITT Recommendation G.704.
[7.3A] Synchronous frame structures used at 1544, 6312, 2048, 8448, 44736 kbit/s hierarchical levels, ITU-T Recommendation G.704, October 1998.
[7.4] Synchronous digital hierarchy bit rates, CCITT Recommendation G.707, Blue Book.
[7.5] Synchronous multiplexing structure, CCITT Recommendation G.709, Blue Book.
[7.6] Pulse Code Modulation (PCM) of Voice Frequencies, ITU-T, Recommendation G.711, Geneva, 1989.
[7.7] 40, 32, 24, 16 kbit/s Adaptive Differential Pulse Code Modulation (ADPCM), ITU-T Recommendation G.726, Geneva, 1990.
[7.8] 5-, 4-, 3- and 2-bits per Sample Embedded Adaptive Differential Pulse Code Modulation (ADPCM), ITU-T Recommendation G.727, Geneva, 1990.
[7.9] Voice Packetization—Packetized Voice Protocol, ANSI Standard T1.312.
[7.10] Digital Hierarchy Electrical Interfaces, ANSI Standard T1.102.
[7.11] Digital Hierarchy Formats Specification, ANSI Standard T1.107.

What is claimed is:

1. A method, comprising:
providing multiple transmission bandwidth streams with differentiated quality of service on a digital bit-stream inter-machine trunk located between a first packet router and a second packet router including:
segregating a packet stream into at least a high-quality of service packet stream and a low-quality of service packet stream using a packet processor located at the first packet router;
buffering the high-quality of service packet stream using a high-quality of service queue;
buffering the low-quality of service packet stream using a low-quality of service queue;
formatting the high-quality of service packet stream to generate a first data stream channel independently of the low-quality of service packet stream;
formatting the low-quality of service packet stream to generate a second data stream channel independently of the high-quality of service packet stream;
time-division multiplexing the first data steam channel and the second data stream channel to define a multiplexed data stream including a plurality of payloads, wherein at least some of each of the plurality of payloads of the multiplexed data stream includes a high-quality of service portion and a low-quality of service portion; and
transmitting the multiplexed data stream on the digital bit stream inter-machine trunk using the first packet router.

2. The method of claim 1, wherein a sum of a first bit-rate of the first data stream channel and a second bit-rate of the second data stream channel is substantially equal to a utilized payload bit-rate of the multiplexed data stream.

3. The method of claim 1, further comprising allocating a first part of each payload of the multiplexed data stream to the high-quality of service portion and a second part of each payload of the multiplexed data stream to the low-quality of service portion.

4. The method of claim 3, further comprising reallocating a fraction of the first part of at least some of each of the plurality of payloads of the multiplexed data stream to the second part of each payload of the multiplexed data stream.

5. The method of claim 4, further comprising detecting a paucity of traffic requiring the first data stream channel before reallocating.

6. The method of claim 3, further comprising reallocating a fraction of the second part of at least some of each of the plurality of payloads of the multiplexed data stream to the first part of each payload of the multiplexed data stream.

7. The method of claim 6, further comprising detecting a congestion of traffic requiring the first data stream channel before reallocating.

8. The method of claim 1, wherein segregating includes segregating the packet stream into another-quality of service packet stream using the packet processor located at the first packet router, and further comprising,
buffering the another-quality of service packet stream using another-quality of service queue; and
formatting the another-quality of service packet stream to generate a third data stream channel independently of both the low-quality of service packet stream and high-quality of service packet stream,
wherein time-division multiplexing includes time-division multiplexing the another data stream channel with the first data stream channel and the second data stream channel to define the multiplexed data stream, wherein a least some of each of the plurality of payloads of the multiplexed data stream includes another-quality of service portion.

9. The method of claim 1, further comprising prioritizing with respect to the high-quality of service queue.

10. The method of claim 9, further comprising scheduling bandwidth with respect to the prioritized high-quality of service queue.

11. The method of claim 1, further comprising prioritizing with respect to the low-quality of service queue.

12. The method of claim 11, further comprising scheduling bandwidth with respect to the prioritized low-quality of service queue.

13. The method of claim 1, further comprising restricting packet size when an outbound packet exceeds a size threshold by segmenting the outbound packet into a plurality of packets, before formatting.

14. The method of claim 1, further comprising restricting packet size when an outbound packet exceeds a size threshold by segmenting the outbound packet into a plurality of packets, before segregating.

15. The method of claim 1, further comprising:
receiving the multiplexed data stream from the digital bit stream inter-machine trunk using the second packet router; and
time-division demultiplexing the first data steam channel and the second data stream channel from the multiplexed data stream using the second packet router.

16. An apparatus, comprising:
a first packet router including a first packet processor;
a digital bit-stream inter-machine trunk coupled to the first packet router; and
a second packet router coupled to the digital bit-stream inter-machine trunk, the second packet router including a second packet processor,
wherein the first packet processor segregates a packet stream into at least a high-quality of service packet stream and a low-quality of service packet stream, and the first packet router:
buffers the high-quality of service packet stream using a high-quality of service queue;

buffers the low-quality of service packet stream using a low-quality of service queue;
formats the high-quality of service packet stream to generate a first data stream channel independently of the low-quality of service packet stream;
formats the low-quality of service packet stream to generate a second data stream channel independently of the high-quality of service packet stream;
time-division multiplexes the first data steam channel and the second data stream channel to define a multiplexed data stream including a plurality of payloads, wherein at least some of each of the plurality of payloads of the multiplexed data stream includes a high-quality of service portion and a low-quality of service portion;
and transmits the multiplexed data stream on the digital bit stream inter-machine trunk using the first packet router.

17. The apparatus of claim 16, wherein the digital bit stream inter-machine trunk is a transmission medium line.

18. The apparatus of claim 16, wherein the first packet router includes a segmentation manager that restricts packet size by segmenting an outbound packet into a plurality of packets when the outbound packet exceeds a size threshold.

19. The apparatus of claim 16, wherein the first packet router includes a queue manager coupled to the high-quality of service queue, the queue manager prioritizing with respect to the high-quality of service queue.

20. The apparatus of claim 19, wherein the first packet router includes a time-interval manager coupled to the queue manager, the time-interval manager scheduling bandwidth with respect to the queue manager.

21. The apparatus of claim 16, wherein the first packet router includes a queue manager that prioritizes with respect to the low-quality of service queue.

22. The apparatus of claim 21, wherein the first packet router includes a time-interval manager coupled to the queue manager, the time-interval manager scheduling bandwidth with respect to the queue manager.

23. The apparatus of claim 16, wherein the first packet router includes a queue manager coupled to both the high-quality of service queue and the low-quality of service queue, the queue manager determining prioritization with respect to both the high-quality of service queue and the low-quality of service queue.

24. The apparatus of claim 23, wherein the first packet router includes a time-interval manager coupled to the queue manager, the time-interval manager scheduling bandwidth with respect to the queue manger.

25. A local area network, comprising the apparatus of claim 16.

26. A metropolitan area network, comprising the apparatus of claim 16.

27. A wide area network, comprising the apparatus of claim 16.

28. A method, comprising
providing multiple transmission bandwidth streams with differentiated quality of service on a digital bit-stream inter-machine trunk located between a first packet router and a second packet router including:
segregating a packet stream into at least a high-quality of service packet stream and a low-quality of service packet stream using a packet processor located at the first packet router;
buffering the high-quality of service packet stream using a high-quality of service queue;
buffering the low-quality of service packet stream using a low-quality of service queue;
formatting the high-quality of service packet stream to generate a first data stream channel independently of the low-quality of service packet stream;
formatting the low-quality of service packet stream to generate a second data stream channel independently of the high-quality of service packet stream;
buffering the first data stream channel using a high-quality of service first-in-first-out queue;
buffering the second data stream channel using a low-quality of service first-in-first-out queue;
statistical-multiplexing the first data steam channel and the second data stream channel to define a multiplexed data stream including a plurality of data structures selected from the group consisting of cells and frames; and
transmitting the multiplexed data stream on the digital bit stream inter-machine trunk using the first packet router.

29. The method of claim 28, wherein a sum of a first bit-rate of the first data stream channel and a second bit-rate of the second data stream channel is substantially equal to a utilized payload bit-rate of the multiplexed data stream.

30. The method of claim 28, wherein the plurality of data structures includes a plurality of cells and statistical-multiplexing includes cell-based-statistical-multiplexing.

31. The method of claim 28, wherein the plurality of data structures includes a plurality of frames and statistical-multiplexing includes frame-based-statistical-multiplexing.

32. The method of claim 31, wherein formatting the low-quality of service packet stream to generate a second data stream channel includes segmenting at least some of the plurality of frames.

33. The method of claim 28, further comprising allocating a first part of the multiplexed data stream to the high-quality of service portion and a second part of the multiplexed data stream to the low-quality of service portion.

34. The method of claim 33, further comprising reallocating a fraction of the first part of the multiplexed data stream to the second part of the multiplexed data stream.

35. The method of claim 34, further comprising detecting a paucity of traffic requiring the first data stream channel before reallocating.

36. The method of claim 33, further comprising reallocating a fraction of the second part of the multiplexed data stream to the first part of the multiplexed data stream.

37. The method of claim 36, further comprising detecting a congestion of traffic requiring the first data stream channel before reallocating.

38. The method of claim 28, wherein segregating includes segregating the packet stream into another-quality of service packet stream using the packet processor located at the first packet router, and further comprising,
buffering the another-quality of service packet stream using another-quality of service queue;
formatting the another-quality of service packet stream to generate a third data stream channel independently of both the low-quality of service packet stream and high-quality of service packet stream; and
buffering the third data stream channel using another first-in-first-out quality of service queue,
wherein statistical multiplexing includes statistical multiplexing the another data stream channel with the first data stream channel and the second data stream channel to define the multiplexed data stream.

39. The method of claim 28, further comprising prioritizing with respect to the high-quality of service queue.

40. The method of claim 39, further comprising scheduling bandwidth with respect to the prioritized high-quality of service queue.

41. The method of claim 28, further comprising prioritizing with respect to the low-quality of service queue.

42. The method of claim 41, further comprising scheduling bandwidth with respect to the prioritized low-quality of service queue.

43. The method of claim 28, further comprising restricting packet size when an outbound packet exceeds a size threshold by segmenting the outbound packet into a plurality of packets, before formatting.

44. The method of claim 28, further comprising:
receiving the multiplexed data stream from the digital bit stream inter-machine trunk using the second packet router; and
time-division demultiplexing the first data steam channel and the second data stream channel from the multiplexed data stream using the second packet router.

45. An apparatus, comprising:
a first packet router including a first packet processor;
a digital bit-stream inter-machine trunk coupled to the first packet router; and
a second packet router coupled to the digital-bit stream inter-machine trunk, the second packet router including a second packet processor,
wherein the first packet processor segregates a packet stream into at least a high-quality of service packet stream and a low-quality of service packet stream, and the first packet router:
buffers the high-quality of service packet stream using a high-quality of service queue;
buffers the low-quality of service packet stream using a low-quality of service queue;
formats the high-quality of service packet stream to generate a first data stream channel independently of the low-quality of service packet stream;
formats the low-quality of service packet stream to generate a second data stream channel independently of the high-quality of service packet stream;
buffers the first data stream channel using a first-in-first-out high-quality of service queue;
buffers the second data stream channel using a first-in-first-out low-quality of service queue;
statistically multiplexes the first data steam channel and the second data stream channel to define a multiplexed data stream including a plurality of data structures selected from the group consisting of cells and frames; and
transmits the multiplexed data stream on the digital bit stream inter-machine trunk using the first packet router.

46. The apparatus of claim 45, wherein the digital bit stream inter-machine trunk is a transmission medium line.

47. The apparatus of claim 45, wherein the first packet router includes an adaptation layer that segments at least some of the plurality of data structures.

48. The apparatus of claim 45, wherein the first packet router includes a segmentation manager that restricts packet size by segmenting an outbound packet into a plurality of packets when the outbound packet exceeds a size threshold.

49. The apparatus of claim 45, wherein the first packet router includes a queue manager coupled to the high-quality of service queue, the queue manager prioritizing with respect to the high-quality of service queue.

50. The apparatus of claim 49, wherein the first packet router includes a time-interval manager coupled to the queue manager, the time-interval manager scheduling bandwidth with respect to the queue manager.

51. The apparatus of claim 45, wherein the first packet router includes a queue manager that prioritizes with respect to the low-quality of service queue.

52. The apparatus of claim 51, wherein the first packet router includes a time-interval manager coupled to the queue manager, the time-interval manager scheduling bandwidth with respect to the queue manager.

53. The apparatus of claim 45, wherein the first packet router includes a queue manager coupled to both the high-quality of service queue and the low-quality of service queue, the queue manager determining prioritization with respect to both the high-quality of service queue and the low-quality of service queue.

54. The apparatus of claim 53, wherein the first packet router includes a time-interval manager coupled to the queue manager, the time-interval manager scheduling bandwidth with respect to the queue manger.

55. A local area network, comprising the apparatus of claim 45.

56. A metropolitan area network, comprising the apparatus of claim 45.

57. A wide area network, comprising the apparatus of claim 45.

58. The method, comprising:
providing transmission bandwidth on a single inter-machine trunk located between a first packet router and a second packet router including:
restricting packet size using a packet processor located at the first packet router when an outbound packet exceeds a size threshold by segmenting the outbound packet into a plurality of packets; and
transmitting the plurality of packets on the single inter-machine trunk using the first packet router,
wherein providing transmission bandwidth on the single inter-machine trunk located between the first packet router and the second packet router includes providing multiple transmission bandwidth streams with differentiated quality of service on the single inter-machine trunk,
and further including:
segregating an outbound packet stream into a high-quality of service outbound packet stream and a low-quality of service outbound packet stream using the packet processor located at the first packet router;
buffering the high-quality of service outbound packet stream using a high-quality of service queue;
buffering the low-quality of service outbound packet stream using a low-quality of service queue;
transmitting the high-quality of service outbound packet stream on the single inter-machine trunk using a high-quality of service permanent virtual circuit; and
transmitting the low-quality of service outbound packet stream on the single inter-machine trunk using a low-quality of service permanent virtual circuit.

59. The method of claim 58, wherein the single inter-machine trunk is a transmission medium line.

60. The method of claim 58, wherein the outbound packet that exceeds the size threshold is from the low-quality of service outbound packet stream.

61. The method of claim 58, wherein the size threshold is a function of an available bandwidth on the single digital bit-stream inter-machine trunk.

62. The method of claim 61, wherein the available bandwidth is with regard to the high-quality of service permanent virtual circuit.

63. The method of claim 61, wherein the available bandwidth is a repetitively measured available bandwidth and the size threshold is dynamically varied based on a calculated level of congestion on the single digital bit-stream inter-machine trunk.

64. The method of claim 63, wherein both the repetitively measured available bandwidth and the calculated level of congestion are with regard to the high-quality of service permanent virtual circuit.

65. The method of claim 58, further comprising prioritizing with respect to the high-quality of service queue.

66. The method of claim 65, further comprising scheduling bandwidth with respect to the prioritized high-quality of service queue.

67. The method of claim 58, further comprising prioritizing with respect to the low-quality of service queue.

68. The method of claim 67, further comprising scheduling bandwidth with respect to the prioritized low-quality of service queue.

69. The method of claim 58, further comprising reassembling the plurality of packets into an inbound packet using a second packet processor at the second packet router, wherein the inbound packet exceeds the size threshold.

70. The apparatus, comprising:
a first packet router including a first packet processor;
a single inter-machine trunk coupled to the first packet router; and
a second packet router coupled to the single inter-machine trunk, the second packet router including a second packet processor,
wherein the first packet processor restricts packet size by segmenting an outbound packet into a plurality of packets when the outbound packet exceeds a size threshold, wherein the first packet router includes at least a high-quality of service outbound queue and a low-quality of service outbound queue, and wherein the first packet processor:
segregates an outbound packet stream into at least a high-quality of service outbound packet stream and a low-quality of service outbound packet stream;
buffers the high-quality of service packet stream using a high-quality of service queue;
buffers the low-quality of service packet stream using a low-quality of service queue;
transmits the high-quality of service packet stream on the single inter-machine trunk using a high-quality of service permanent virtual circuit; and
transmits the low-quality of service packet stream on the single inter-machine trunk using a low-quality of service permanent virtual circuit.

71. The apparatus of claim 70, wherein the first packet router includes a queue manager that prioritizes with respect to the high-quality of service queue.

72. The apparatus of claim 71, wherein the first packet router includes a time-interval manager coupled to the queue manager, the time-interval manager scheduling bandwidth with respect to the queue manager.

73. The apparatus of claim 70, wherein the first packet router includes a queue manager that prioritizes with respect to the low-quality of service queue.

74. The apparatus of claim 73, wherein the first packet router includes a time-interval manager coupled to the queue manager, the time-interval manager scheduling bandwidth with respect to the queue manager.

75. The apparatus of claim 70, wherein the first packet router includes a queue manager coupled to both the high-quality of service queue and the low-quality of service queue, the queue manager determining prioritization with respect to both the high-quality of service queue and the low-quality of service queue.

76. The apparatus of claim 75, wherein the first packet router includes a time-interval manager coupled to the queue manager, the time-interval manager scheduling bandwidth with respect to the queue manager.

77. A local area network, comprising the apparatus of claim 70.

78. A metropolitan area network, comprising the apparatus of claim 70.

79. A wide area network, comprising the apparatus of claim 70.

* * * * *

UNITED STATES PATENT AND TRADEMARK OFFICE
CERTIFICATE OF CORRECTION

PATENT NO.         : 7,535,900 B2
APPLICATION NO. : 10/759391
DATED                  : May 19, 2009
INVENTOR(S)        : Kishan Shenoi It is certified that error appears in the above-identified patent and that said Letters Patent is hereby corrected as shown below:

On the coverpage, Item 54, replace the title "MULTIPLE TRANSMISSION BANDWIDTH STREAMS WITH DEFFERENTIATED QUALITY OF SERVICE" with -- MULTIPLE TRANSMISSION BANDWIDTH STREAMS WITH DIFFERENTIATED QUALITY OF SERVICE --

In column 25, line 49, please replace "data steam channel" with -- data stream channel --

In column 26, line 26, please replace "wherein a" with -- wherein at --

In column 26, line 52, please replace "data steam channel" with -- data stream channel --

In column 27, line 9, please replace "data steam channel" with -- data stream channel --

In column 28, line 11, please replace "data steam channel" with -- data stream channel --

In column 29, line 14, please replace "data steam channel" with -- data stream channel --

In column 29, line 42, please replace "data steam channel" with -- data stream channel --

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,535,900 B2
APPLICATION NO. : 10/759391
DATED : May 19, 2009
INVENTOR(S) : Kishan Shenoi It is certified that error appears in the above-identified patent and that said Letters Patent is hereby corrected as shown below:

On the Title Page, Item (54) and Column 1, lines 1-3, replace the title "MULTIPLE TRANSMISSION BANDWIDTH STREAMS WITH DEFFERENTIATED QUALITY OF SERVICE" with -- MULTIPLE TRANSMISSION BANDWIDTH STREAMS WITH DIFFERENTIATED QUALITY OF SERVICE --

In column 25, line 49, please replace "data steam channel" with -- data stream channel --

In column 26, line 26, please replace "wherein a" with -- wherein at --

In column 26, line 52, please replace "data steam channel" with -- data stream channel --

In column 27, line 9, please replace "data steam channel" with -- data stream channel --

In column 28, line 11, please replace "data steam channel" with -- data stream channel --

In column 29, line 14, please replace "data steam channel" with -- data stream channel --

In column 29, line 42, please replace "data steam channel" with -- data stream channel --

This certificate supersedes the Certificate of Correction issued November 10, 2009.

Signed and Sealed this

First Day of December, 2009

David J. Kappos
*Director of the United States Patent and Trademark Office*